(12) United States Patent
Ang

(10) Patent No.: US 9,160,184 B2
(45) Date of Patent: Oct. 13, 2015

(54) ADAPTER AND VEHICLE EQUIPPED THEREWITH, AND METHOD FOR CONTROLLING THE VEHICLE

(75) Inventor: Wanleng Ang, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 286 days.

(21) Appl. No.: 13/982,540

(22) PCT Filed: Feb. 15, 2011

(86) PCT No.: PCT/JP2011/053087
§ 371 (c)(1),
(2), (4) Date: Jul. 30, 2013

(87) PCT Pub. No.: WO2012/111081
PCT Pub. Date: Aug. 23, 2012

(65) Prior Publication Data
US 2013/0314034 A1    Nov. 28, 2013

(51) Int. Cl.
*H02J 7/00*    (2006.01)
*B60W 20/00*    (2006.01)
(Continued)

(52) U.S. Cl.
CPC ............. *H02J 7/0042* (2013.01); *B60L 3/0069* (2013.01); *B60L 3/04* (2013.01); *B60L 7/14* (2013.01); *B60L 11/123* (2013.01); *B60L 11/14* (2013.01); *B60L 11/1818* (2013.01); *B60L 11/1864* (2013.01); *B60L 15/2009* (2013.01); *B60W 20/00* (2013.01); *H01R 31/065* (2013.01); *B60K 6/22* (2013.01); *B60K 6/445* (2013.01);
(Continued)

(58) Field of Classification Search
CPC ...................................................... H02J 7/0055
USPC .......................................................... 320/107
See application file for complete search history.

(56) References Cited

U.S. PATENT DOCUMENTS

2010/0188040 A1* 7/2010 Reed ............................. 320/107
2011/0279089 A1* 11/2011 Yeo .............................. 320/134
(Continued)

FOREIGN PATENT DOCUMENTS

| JP | A-2009-278776 | 11/2009 |
| JP | A-2010-165596 | 7/2010 |
| WO | WO 2010/097922 A1 | 9/2010 |

*Primary Examiner* — Suchin Parihar
(74) *Attorney, Agent, or Firm* — Oliff PLC

(57) ABSTRACT

A conventional vehicular charging port (or inlet) is geometrically different from a power supply plug of general electrical equipment, and the power supply plug cannot directly be connected to the inlet. The present invention provides an adapter (800) including a first connection portion (801) that corresponds in geometry to an inlet (270) and a second connection portion (805) that corresponds in geometry to a power supply plug of electrical equipment (700) external to a vehicle. Furthermore, the adapter (800) includes a second control device (850) capable of outputting a signal to a first control device (170) of the vehicle. When the first connection portion (801) is connected to the inlet (270), the second control device (850) outputs a power supply instruction signal, which is indicative of an instruction to supply electric power, to the first control device (170) to cause the first control device (170) to control a power conversion device (160) of the vehicle to supply electric power from the power conversion device (160) to the electrical equipment (700). Thus the power supply plug of the electrical equipment (700) can be connected to the vehicle to supply electric power from the vehicle to the electrical equipment (700).

16 Claims, 14 Drawing Sheets

(51) Int. Cl.
  *H01R 31/06* (2006.01)
  *B60L 11/18* (2006.01)
  *B60L 3/00* (2006.01)
  *B60L 3/04* (2006.01)
  *B60L 11/12* (2006.01)
  *B60L 11/14* (2006.01)
  *B60L 7/14* (2006.01)
  *B60L 15/20* (2006.01)
  *B60K 6/22* (2007.10)
  *B60K 6/445* (2007.10)

(52) U.S. Cl.
  CPC .......... *B60L2210/30* (2013.01); *B60L 2210/40* (2013.01); *B60L 2230/12* (2013.01); *B60L 2240/423* (2013.01); *B60L 2240/545* (2013.01); *B60L 2240/547* (2013.01); *B60L 2240/549* (2013.01); *Y02T 10/6217* (2013.01); *Y02T 10/6239* (2013.01); *Y02T 10/6269* (2013.01); *Y02T 10/642* (2013.01); *Y02T 10/7005* (2013.01); *Y02T 10/7061* (2013.01); *Y02T 10/7077* (2013.01); *Y02T 10/7088* (2013.01); *Y02T 10/7241* (2013.01); *Y02T 10/7275* (2013.01); *Y02T 90/121* (2013.01); *Y02T 90/127* (2013.01); *Y02T 90/14* (2013.01)

(56) References Cited

U.S. PATENT DOCUMENTS

| | | | |
|---|---|---|---|
| 2011/0300753 A1* | 12/2011 | Ichikawa et al. | 439/620.21 |
| 2014/0002011 A1* | 1/2014 | Ang et al. | 320/107 |
| 2014/0002024 A1* | 1/2014 | Ang et al. | 320/109 |
| 2014/0035512 A1* | 2/2014 | Kamachi | 320/103 |

* cited by examiner

ADAPTER AND VEHICLE EQUIPPED THEREWITH, AND METHOD FOR CONTROLLING THE VEHICLE

TECHNICAL FIELD

The present invention relates generally to an adapter and a vehicle equipped therewith, and a method for controlling the vehicle, and particularly to a technique to supply external electrical equipment with electric power generated by the vehicle.

BACKGROUND ART

In recent years, a vehicle that has a power storage device (such as a rechargeable battery or a capacitor) incorporated therein and travels with driving force generated from electric power stored in the power storage device is attracting attention as an environmentally friendly vehicle. Such a vehicle includes, for example, an electric vehicle, a hybrid vehicle, a fuel cell vehicle, and the like. A technique has been proposed for charging the power storage device that is mounted on such a vehicle from an efficiently power generating, commercial power supply.

As well as an electric vehicle, there is also a hybrid vehicle known as a vehicle that allows a power supply external to the vehicle (hereinafter also simply referred to as an "external power supply") to be used to charge a power storage device mounted thereon (hereinafter also simply referred to as "external charging"). For example, a so called "plug-in hybrid vehicle" is known that allows a power storage device to be charged by a power supply in a general household by connecting a power outlet of a house and a charging port of the vehicle via a charging cable. It can thus be expected that a hybrid vehicle achieves more efficient fuel consumption.

Japanese Patent Laying-Open No. 2010-165596 (PTD 1) discloses a technique helping to insert a connector of a charging connector into a charging port (hereinafter also referred to as an "inlet") of an externally chargeable vehicle as described above.

CITATION LIST

Patent Document

PTD 1: Japanese Patent Laying-Open No. 2010-165596
PTD 2: Japanese Patent Laying-Open No. 2009-278776
PTD 3: WO2010/097922

SUMMARY OF THE INVENTION

Technical Problem

For such an externally chargeable vehicle, a concept has been discussed to consider the vehicle as a power supply source to supply electric power from the vehicle to general electrical equipment external to the vehicle, as seen in the smart grid. Furthermore, the vehicle may be used as a power supply when electrical equipment is used in camping, outdoor and other activities.

Generally, a connector of a charging cable used in the external charging and a vehicular inlet allowing the connector to be connected thereto are different in geometry from a power supply plug of general electrical equipment, as in an example described in Japanese Patent Laying-Open No. 2010-165596 (PTD 1). As such, it is often the case that the electrical equipment's power supply plug cannot directly be connected to the inlet.

The present invention has been made to address such an issue, and it contemplates a conversion adaptor for an inlet for connecting a power supply plug of electrical equipment external to an externally chargeable vehicle to the vehicle for use in supplying electric power from the vehicle to the electrical equipment.

Solution to Problem

The present invention provides an adapter connected to a vehicle capable of external charging to charge a power storage device mounted therein with electric power supplied from an external power supply via a charging cable, the adapter being used to receive electric power from a power generation device mounted in the vehicle and supply the received electric power to electrical equipment external to the vehicle. The adapter includes: a first connection portion that corresponds in geometry to an inlet allowing the charging cable to be connected thereto and is connectable to the inlet; and a second connection portion that is electrically connected to the first connection portion, and also corresponds in geometry to a power supply plug of the electrical equipment and allows the power supply plug to be connected thereto.

Preferably, the vehicle includes a power conversion device for converting electric power received from the power generation device, and supplying the converted electric power to the inlet, and a first control device for controlling the power conversion device. The adapter further includes a second control device configured to be capable of outputting a signal to the first control device. The second control device, with the first connection portion connected to the inlet, outputs a power supply instruction signal, which is indicative of an instruction to supply electric power to the electrical equipment, to the first control device to cause the first control device to control the power conversion device to supply electric power from the power generation device to the electrical equipment.

Preferably, the power supply instruction signal is output by utilizing a path transmitting a pilot signal to transmit information of a current-carrying capacity of the charging cable from the charging cable to the first control device.

Preferably, the power supply instruction signal is output by using a frequency of the pilot signal different from a frequency used in the external charging.

Preferably, the power supply instruction signal is output by using a potential of the pilot signal different from a potential used in the external charging.

Preferably, the power supply instruction signal is output by utilizing a path transmitting a connection signal indicating that a connector of the charging cable is connected to the inlet.

Preferably, the power supply instruction signal is output by using a potential of the connection signal different from a potential used in the external charging.

Preferably, the power supply instruction signal is transmitted from the second control device to the first control device via at least any one of wired communication and wireless communication.

Preferably, the first connection portion and the second connection portion are formed in one piece in structure.

Preferably, the first connection portion and the second connection portion are discrete components, respectively, and interconnected via a power transmission medium.

The present invention provides a vehicle allowing a power storage device mounted therein to be charged with electric power supplied from an external power supply via a charging cable, the vehicle allowing an adapter to be connected thereto to supply electric power to external electrical equipment. The vehicle includes: a power generation device; an inlet for connecting the charging cable in external charging; a power conversion device for converting electric power received from the power generation device, and supplying the converted electric power to the inlet; and a first control device for controlling the power conversion device. The adapter includes a first connection portion connectable to the inlet, a second connection portion allowing a power supply plug of the electrical equipment to be connected thereto, and a second control device configured to be capable of outputting a signal to the first control device. The first control device is operative in response to a power supply instruction signal, which is indicative of an instruction to supply electric power to the electrical equipment, output from the second control device to control the power conversion device to supply electric power from the power generation device to the electrical equipment connected to the second connection portion.

Preferably, the power generation device includes the power storage device for supplying electric power used to generate driving force to drive the vehicle.

Preferably, the power generation device includes an internal combustion engine and a rotating electric machine configured to be driven by the internal combustion engine to generate electric power, and the electric power generated by the rotating electric machine is supplied to the electrical equipment via the adapter.

The present invention provides a method of supplying electrical equipment external to a vehicle via an adapter with electric power received from a power generation device mounted in the vehicle. The vehicle is capable of external charging to charge a power storage device mounted therein with electric power supplied from an external power supply via a charging cable. The vehicle includes an inlet for connecting the charging cable in the external charging, and a power conversion device for converting electric power received from the power generation device, and supplying the converted electric power to the inlet. The adapter includes a first connection portion that corresponds in geometry to the inlet and is connectable to the inlet, and a second connection portion that is electrically connected to the first connection portion, and also corresponds in geometry to a power supply plug of the electrical equipment and allows the power supply plug to be connected thereto. The method includes the steps of: connecting the first connection portion to the inlet; connecting the power supply plug to the second connection portion; receiving a power supply instruction signal output from the adapter and indicative of an instruction to supply electric power to the electrical equipment; and in response to the power supply instruction signal, controlling the power conversion device to supply electric power from the power generation device to the electrical equipment.

Advantageous Effect of Invention

The present invention allows a conversion adaptor for an inlet to be used to connect a power supply plug of electrical equipment external to a vehicle directly to the vehicle to supply the electrical equipment with electric power from the vehicle.

DESCRIPTION OF EMBODIMENTS

The present invention will be described in embodiments hereinafter in detail with reference to the drawings. In the figures, identical or corresponding components are identically denoted and will not be described repeatedly.

Charging System

Figure 1:
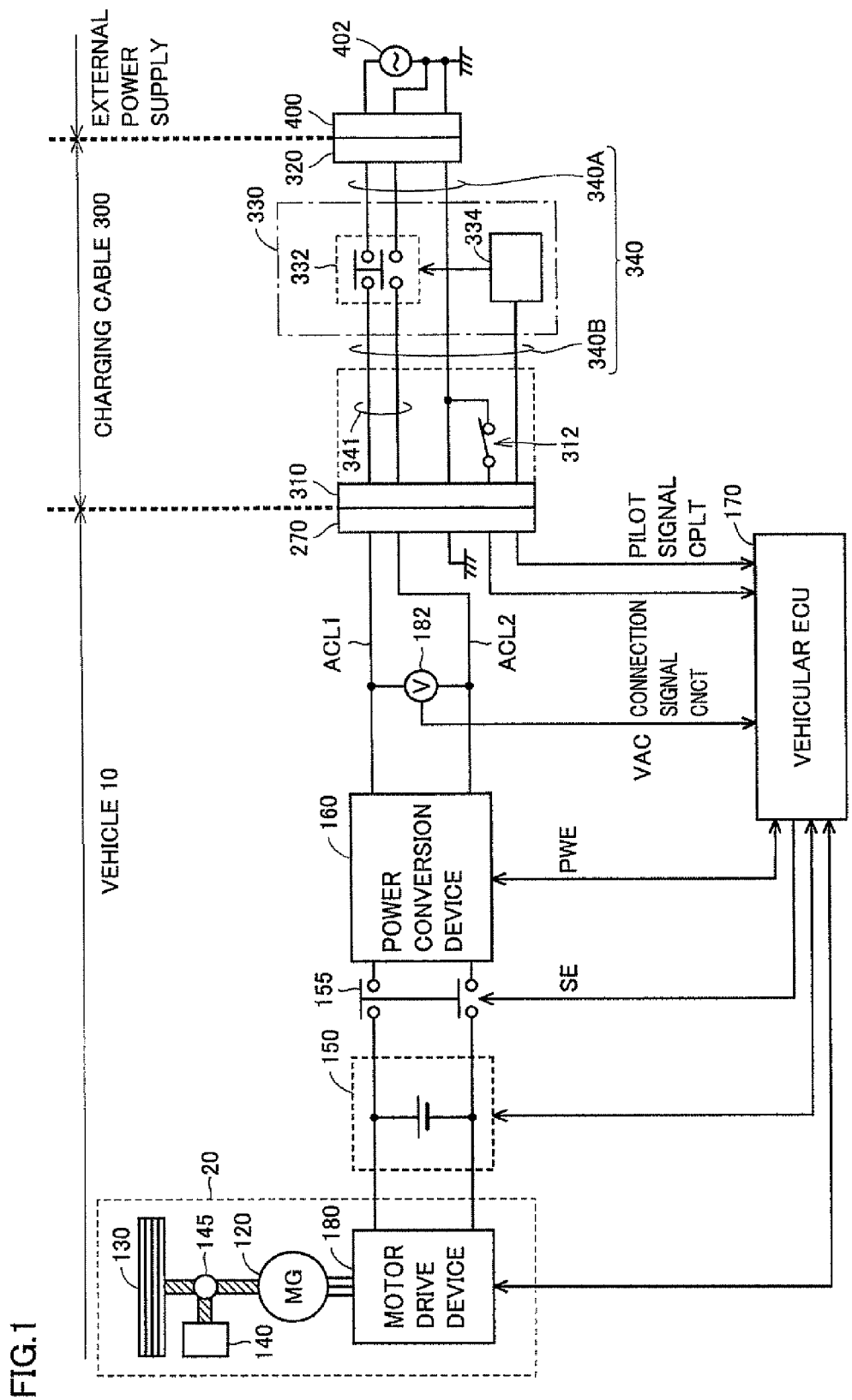
FIG. 1 is a general block diagram of a charging system for a vehicle according to the present embodiment.

FIG. 1 is a schematic diagram of a charging system for a vehicle 10 according to a first embodiment. In FIG. 1, a case will be described in which a power storage device 150 mounted in vehicle 10 is charged with electric power supplied from an external power supply 402.

It is noted that vehicle 10 is not particularly limited in configuration so long as it can travel with electric power received from a power storage device chargeable by an external power supply. Vehicle 10 includes a hybrid vehicle, an electric vehicle, a fuel cell powered vehicle and the like for example. Furthermore, the present invention is applicable to any vehicle having a chargeable power storage device incorporated therein, even if for example the vehicle travels using an internal combustion engine.

With reference to FIG. 1, vehicle 10 includes an inlet 270, a power conversion device 160, a relay 155, a power storage device 150, a drive unit 20, a vehicular electronic control unit (vehicular ECU) 170, and a voltage sensor 182. Drive unit 20 includes a motor drive unit 180, a motor generator (hereinafter also referred to as "MG") 120, a driving wheel 130, an engine 140, and a power split device 145.

A connector 310 included in a charging cable 300 is connected to inlet 270.

Power conversion device 160 is connected to inlet 270 via power lines ACL1 and ACL2. Furthermore, power conversion device 160 is connected to power storage device 150 via relay 155. Power conversion device 160 operates in response to a control signal PWE issued from vehicular ECU 170 to convert AC power that is supplied from a power supply 402 external to the vehicle to DC power with which power storage device 150 can be charged and to supply the DC power to power storage device 150.

Power storage device 150 is a chargeably and dischargeably configured electric power storage component. Power storage device 150 for example includes a rechargeable battery such as a lithium ion battery, a nickel metal hydride battery or a lead acid battery, or a power storage element such as an electric double layer capacitor, or the like.

Power storage device 150 stores DC power supplied from power conversion device 160. Power storage device 150 is connected to motor drive device 180 driving MG 120 and it supplies DC power used to generate driving force to cause the vehicle to travel. Furthermore, power storage device 150 stores electric power generated by MG 120.

Furthermore, although not shown, power storage device 150 includes a voltage sensor for sensing the voltage of power storage device 150 and a current sensor for sensing a current input/output to/from power storage device 150, and outputs to vehicle ECU 170 the values of the voltage and current sensed by these sensors.

Motor drive device 180 is connected to power storage device 150 and MG 120. Motor drive device 180 is controlled by vehicular ECU 170 to convert electric power that is supplied from power storage device 150 to electric power for driving MG 120. Motor drive device 180 is configured for example to include a three-phase inverter.

MG 120 is connected to motor drive unit 180 and to driving wheel 130 via power split device 145. MG 120 receives electric power supplied from motor drive device 180 to generate driving force for causing vehicle 10 to travel. Furthermore, MG 120 receives torque from driving wheel 130 to generate AC power, and also generates regenerative braking force in response to a regenerative torque command received from vehicular ECU 170. MG 120 is configured for example to include a three-phase AC motor generator including a rotor having a permanent magnet embedded therein and a stator having a Y-connected three-phase coil.

MG 120 is also connected to engine 140 via power split device 145. Vehicular ECU 170 performs control to allow the engine and MG 120 to provide driving force at an optimal ratio. Furthermore, MG 120 can also be driven by engine 140 to operate as a power generator. MG 120 generates electric power which is in turn stored to power storage device 150. Alternatively, the electric power generated by MG 120 can be supplied to electrical equipment external to the vehicle through inlet 270, as will be described later.

Voltage sensor 182 is connected between power lines ACL1 and ACL2 and senses voltage of electric power supplied from external power supply 402. Voltage sensor 182 outputs its sensed voltage value VAC to vehicular ECU 170.

Relay 155 is inserted in a path connecting power conversion device 160 and power storage device 150. Relay 155 is controlled by a control signal SE issued from vehicular ECU 170 to switch supplying electric power between power conversion device 160 and power storage device 150 to interrupting electric power therebetween and vice versa. Note that while the present embodiment provides relay 155 discretely, relay 155 may alternatively be included in power storage device 150 or power conversion device 160.

Vehicular ECU 170 includes a central processing unit (CPU), a memory device, and an input/output buffer, none of which is shown in FIG. 1, and vehicular ECU 170 receives a signal from each sensor and the like and outputs a control command to each device, and controls vehicle 10 and each device. It is noted that such control is not limited to processing using software, and dedicated hardware (electronic circuitry) may be constructed for processing such control.

Vehicular ECU 170 receives a connection signal CNCT and a pilot signal CPLT from charging cable 300 through inlet 270. Furthermore, vehicular ECU 170 receives sensed voltage value VAC of received electric power from voltage sensor 182.

Vehicular ECU 170 receives sensed values regarding a current, a voltage and a temperature from a sensor (not shown) provided in power storage device 150 and calculates a state quantity indicating a state of charge (hereinafter also referred to as "SOC") of power storage device 150.

Then, vehicular ECU 170 uses such information to control power conversion device 160, relay 155 and the like for charging power storage device 150.

Charging cable 300 includes connector 310 provided at an end thereof associated with the vehicle, a plug 320 provided at an end thereof associated with the external power supply, a charging circuit interrupt device (hereinafter also referred to as "CCID") 330, and an electric line portion 340 interconnecting devices and inputting and outputting electric power and a control signal.

Electric line portion 340 includes an electric line portion 340A interconnecting plug 320 and CCID 330 and an electric line portion 340B interconnecting connector 310 and CCID 330. Furthermore, electric line portion 340 includes a power line 341 for transmitting electric power received from external power supply 402.

Charging cable 300 is connected to a power outlet 400 of external power supply 402 (e.g., a commercial power supply) via plug 320 of charging cable 300. Furthermore, inlet 270 provided in the body of vehicle 10 and connector 310 of charging cable 300 are connected together so that electric power from power supply 402 external to the vehicle is transmitted to vehicle 10. Charging cable 300 can be attached to and detached from external power supply 402 and vehicle 10.

A connection sensing circuit 312 is provided within connector 310 for sensing whether connector 310 is connected, and connection sensing circuit 312 senses a connection status between inlet 270 and connector 310. Connection sensing circuit 312 outputs connection signal CNCT indicating a connection status to the vehicle 10 vehicular ECU 170 via inlet 270.

Connection sensing circuit 312 may be configured as a limit switch as shown in FIG. 1 so that connection signal CNCT attains a ground potential (0V) when connector 310 is connected to inlet 270. Alternatively, connection sensing circuit 312 may be configured as a resistor (not shown) having a prescribed resistance value so that connection signal CNCT is lowered to a prescribed potential when the connector is connected. In any case, vehicular ECU 170 detects the potential of connection signal CNCT to detect that connector 310 has been connected to inlet 270.

CCID 330 includes a CCID relay 332 and a control pilot circuit 334. CCID relay 332 is inserted, within charging cable 300 at power line 341. CCID relay 332 is controlled by control pilot circuit 334. While CCID relay 332 is opened, an electric path is disconnected in charging cable 300. On the other hand, when CCID relay 332 is closed, electric power is supplied from external power supply 402 to vehicle 10.

Control pilot circuit 334 outputs pilot signal CPLT to vehicular ECU 170 through connector 310 and inlet 270. Pilot signal CPLT is a signal for notifying vehicular ECU 170 of a rated current of charging cable 300 from control pilot circuit 334. Furthermore, pilot signal CPLT is also used as a signal for remotely controlling CCID relay 332 from vehicular ECU 170, based on a potential of pilot signal CPLT controlled by vehicular ECU 170. Control pilot circuit 334 controls CCID relay 332 based on the variation of the potential of pilot signal CPLT.

Pilot signal CPLT and connection signal CNCT, and the shape and terminal arrangement of inlet 270 and connector 310, and the like are standardized for example in the Society of Automotive Engineers (SAE) of the United States, the Japan Electric Vehicle Association, or the like.

Figure 2:
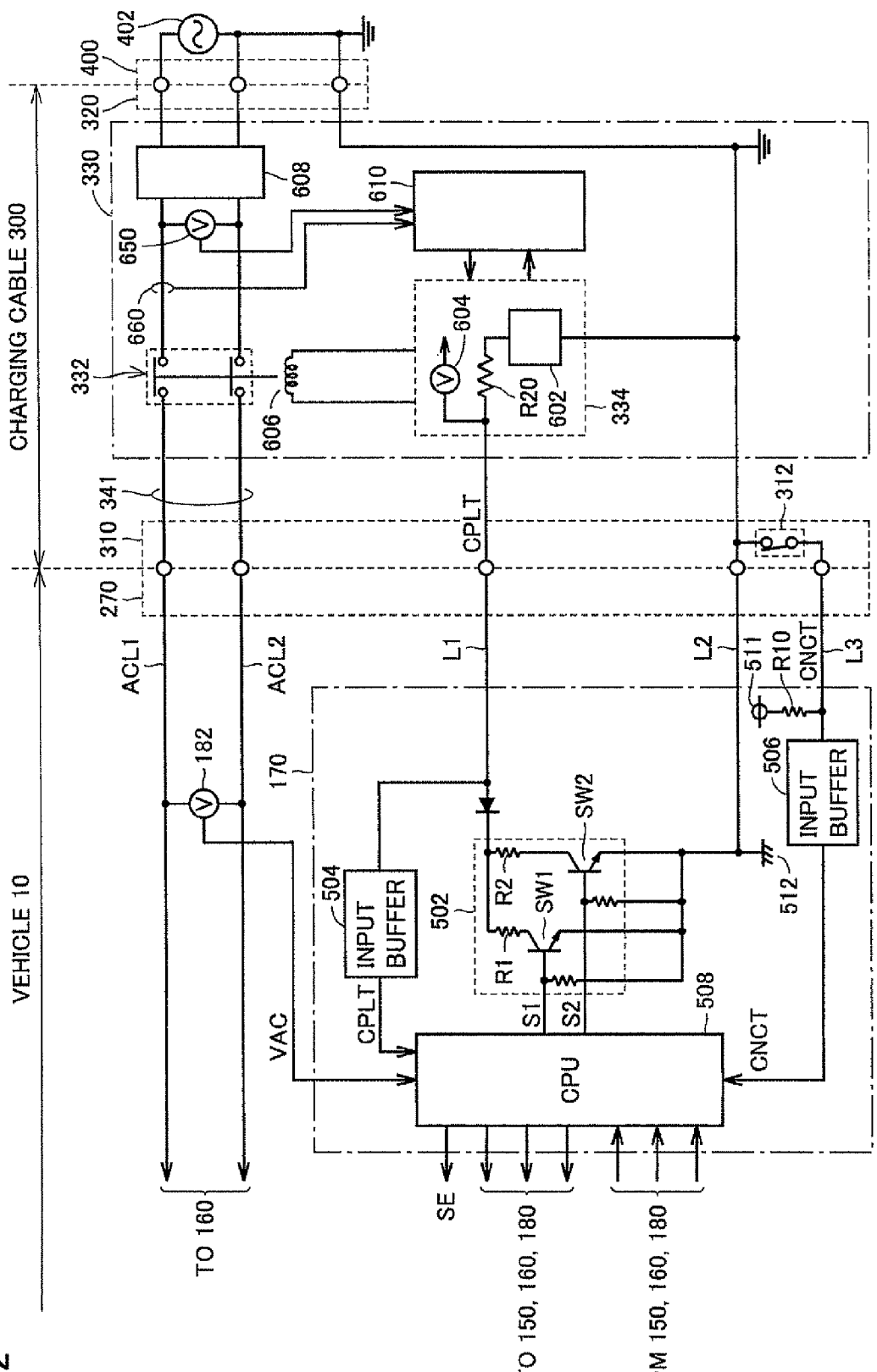
FIG. 2 specifically shows an example of the charging mechanism shown in FIG. 1.

FIG. 2 is a diagram for illustrating the charging circuit shown in FIG. 1 in further detail. It should be noted that those components shown in FIG. 2 which are denoted by reference characters identical to those indicated in FIG. 1 will not be described repeatedly.

Referring to FIG. 2, CCID 330 further includes an electromagnetic coil 606, a leakage detector 608, a CCID control unit 610, a voltage sensor 650, and a current sensor 660, in addition to CCID relay 332 and control pilot circuit 334. Furthermore, control pilot circuit 334 includes an oscillation device 602, a resistor R20, and a voltage sensor 604.

CCID control unit 610 includes a CPU, a memory device, and an input/output buffer, none of which is shown, and it receives and outputs a signal from/to each sensor and control pilot circuit 334 and controls a charging operation of charging cable 300.

Oscillation device 602 outputs a non-oscillating signal when voltage sensor 604 senses that pilot signal CPLT has a defined potential (for example of 12 V), whereas when the potential of pilot signal CPLT is lowered from the defined potential (for example to 9 V), oscillation device 602 is controlled by CCID control unit 610 to output a signal oscillating at a defined frequency (e.g., 1 kHz) and a defined duty cycle.

As will be described later with reference to FIG. 3, the potential of pilot signal CPLT is controlled by vehicular ECU 170. Furthermore, the duty cycle is set based on a rated current that can be supplied from external power supply 402 through charging cable 300 to vehicle 10.

Pilot signal CPLT oscillates periodically, as defined, when the potential of pilot signal CPLT is lowered from the defined potential, as described above. Here, a pulse width of pilot signal CPLT is set based on a rated current that can be supplied from external power supply 402 through charging cable 300 to vehicle 10. In other words, control pilot circuit 334 notifies the vehicle 10 vehicular ECU 170 of a rated current by using pilot signal CPLT, based on a duty indicated by a ratio of the pulse width to the oscillation period.

It is noted that the rated current is determined for each charging cable and it varies with the type of charging cable 300. Therefore, a duty ratio of pilot signal CPLT will also vary for each charging cable 300.

Vehicular ECU 170 can detect a rated current that can be supplied through charging cable 300 to vehicle 10, based on a duty ratio of pilot signal CPLT received on a control pilot line L1.

When vehicular ECU 170 further lowers the potential of pilot signal CPLT (for example to 6 V), control pilot circuit 334 supplies a current to electromagnetic coil 606. When electromagnetic coil 606 receives a current from control pilot circuit 334, electromagnetic coil 606 generates electromagnetic force and closes a contact of CCID relay 332 to provide a conducting state.

Leakage detector 608 is provided in charging cable 300 at some midpoint of power line 341 within CCID 330 and detects whether there is leakage. Specifically, leakage detector 608 detects a balance state between currents that flow in directions opposite to each other through a pair of power lines 341 and detects that leakage has occurred when that balance state is lost. Although not shown in the figure, when leakage detector 608 detects leakage, electric power supplied to electromagnetic coil 606 is interrupted and the contact of CCID relay 332 is opened to provide a non conducting state.

When plug 320 of charging cable 300 is inserted into power outlet 400, voltage sensor 650 senses power supply voltage transmitted from external power supply 402 and notifies CCID control unit 610 of the sensed value. Current sensor 660 senses a charging current flowing through power line 341 and notifies CCID control unit 610 of the sensed value.

As described above, connection sensing circuit 312 included in connector 310 is implemented for example as a limit switch. A contact of the limit switch is closed while connector 310 is connected to inlet 270, and the contact is opened while connector 310 is disconnected from inlet 270.

When connector 310 is disconnected from inlet 270, a voltage signal determined by a voltage of a power supply node 511 and a pull-up resistor R10 included in vehicular ECU 170 is generated as connection signal CNCT on a connection signal line L3. On the other hand, when connector 310 is connected to inlet 270, connection signal line L3 is short-circuited to a ground line L2, and accordingly, connection signal line L3 attains ground potential (0 V).

It is noted that connection sensing circuit 312 may be implemented as a resistor (not shown). In that case, when connector 310 is connected to inlet 270, a voltage signal determined by a voltage of power supply node 511 and pull-up resistor R10 as well as by this resistor is generated on connection signal line L3.

Whichever of the limit switch or the resistor connection sensing circuit 312 may be, a potential on connection signal line L3 (i.e., that of connection signal CNCT) varies between when connector 310 is connected to inlet 270 and when connector 310 is disconnected from inlet 270. Therefore, by detecting the potential of connection signal line L3, vehicular ECU 170 can detect what connection status connector 310 has.

In vehicle 10, vehicular ECU 170 further includes a resistor circuit 502, input buffers 504 and 506, and a CPU 508, in addition to power supply node 511 and pull-up resistor R10 described above.

Resistor circuit 502 includes pull-down resistors R1 and R2 and switches SW1 and SW2. Pull-down resistor R1 and switch SW1 are connected in series between control pilot line L1 passing pilot signal CPLT and a vehicular ground 512. Pull-down resistor R2 and switch SW2 are also connected in series between control pilot line L1 and vehicular ground 512. Switches SW1 and SW2 are controlled by control signals S1 and S2, respectively, issued from CPU 508 to conduct or not to conduct.

Resistor circuit 502 is a circuit for controlling the potential of pilot signal CPLT from vehicle 10.

Input buffer 504 receives pilot signal CPLT on control pilot line L1 and outputs received pilot signal CPLT to CPU 508. Input buffer 506 receives connection signal CNCT from connection signal line L3 connected to connection sensing circuit 312 of connector 310 and outputs received connection signal CNCT to CPU 508. Note that, as described above, a voltage is applied to connection signal line L3 by vehicular ECU 170, and connecting connector 310 to inlet 270 varies the potential of connection signal CNCT. CPU 508 detects this potential of connection signal CNCT to detect a connection status of connector 310.

CPU 508 receives pilot signal CPLT and connection signal CNCT from input buffers 504 and 506, respectively.

CPU 508 detects the potential of connection signal CNCT and detects the connection status of connector 310.

Furthermore, CPU 508 detects a rated current of charging cable 300, as described above, by sensing a state of oscillation of pilot signal CPLT and a duty cycle thereof.

CPU 508 controls the potential of pilot signal CPLT by controlling control signals S1 and S2 for switches SW1 and SW2, respectively, based on the potential of connection signal CNCT and the state of oscillation of pilot signal CPLT. Thus, CPU 508 can remotely control CCID relay 332. Electric power is thus transmitted from external power supply 402 through charging cable 300 to vehicle 10.

With reference to FIG. 1 and FIG. 2, when the contact of CCID relay 332 is closed, power conversion device 160 is provided with AC power from external power supply 402 and a preparation is completed for charging power storage device 150 from external power supply 402. CPU 508 outputs control signal PWE to power conversion device 160 to convert AC power received from external power supply 402 into DC power that can be charged to power storage device 150. Then, CPU 508 outputs control signal SE to close a contact of relay 155 to charge power storage device 150.

Figure 3:
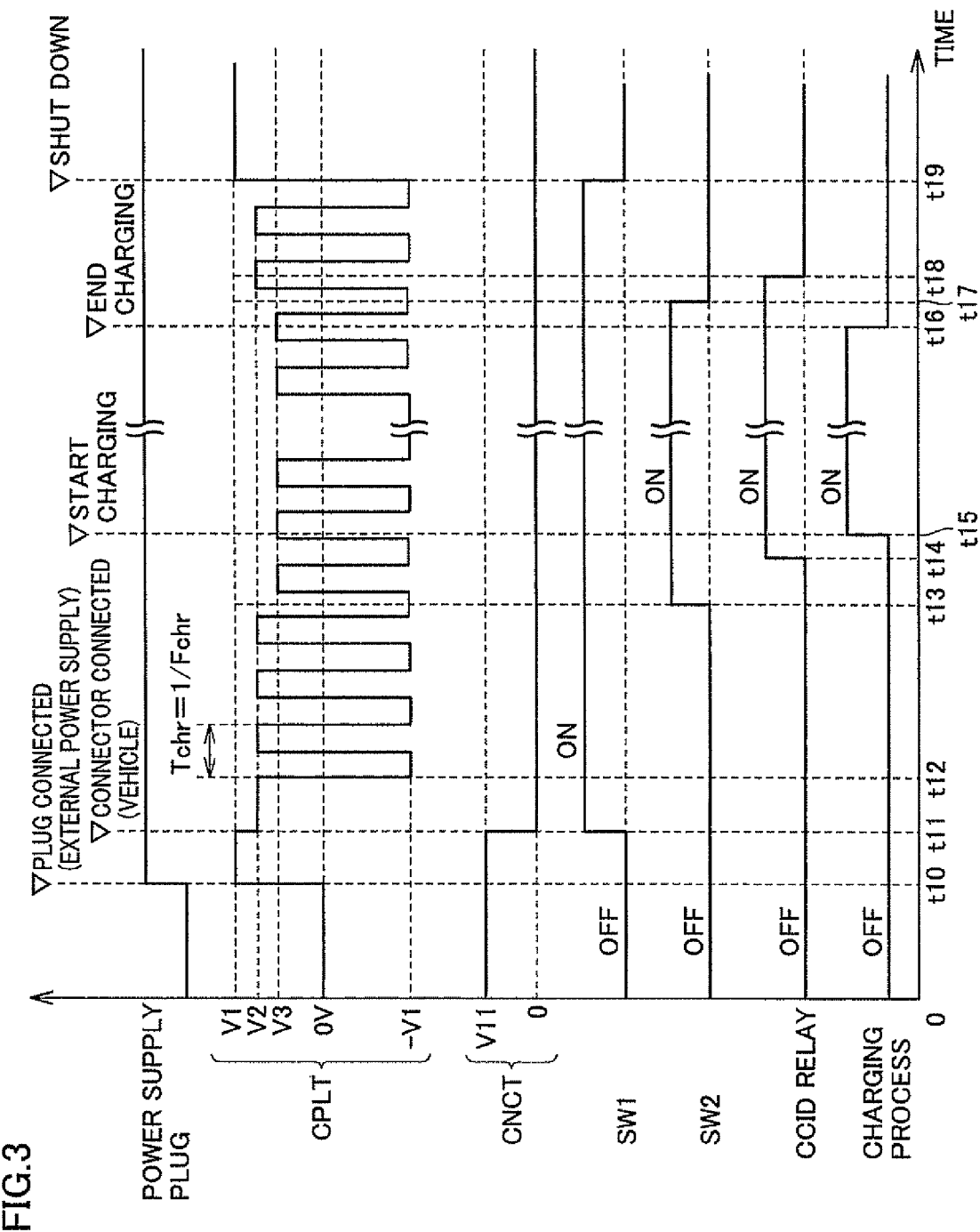
FIG. 3 is a timing chart for illustrating charging control when the external charging is performed.

FIG. 3 is a timing chart for illustrating charging control in the charging system of FIG. 2. In FIG. 3, an axis of abscissa represents time and an axis of ordinate represents a connection status of plug 320, a potential of pilot signal CPLT, a potential of connection signal CNCT, statuses of switches SW1 and SW2, a status of CCID relay 332, and a status of a charging process.

With reference to FIG. 2 and FIG. 3, before time t10 arrives, charging cable 300 is neither connected to vehicle 10 nor external power supply 402. In this state, switches SW1 and SW2 and CCID relay 332 are turned off and pilot signal CPLT has a potential of 0 V. Furthermore, connection signal CNCT has a potential V11 (>0 V).

At time t10, plug 320 of charging cable 300 is connected to power outlet 400 of external power supply 402, and electric power is received from external power supply 402 and control pilot circuit 334 generates pilot signal CPLT.

Note that connector 310 of charging cable 300 is not connected to inlet 270 at time t10. Furthermore, pilot signal CPLT has a potential V1 (e.g., 12 V), and pilot signal CPLT is not oscillating.

At time t11, connector 310 is connected to inlet 270, and the potential of connection signal CNCT is lowered by connection sensing circuit 312.

Then, CPU 508 detects that the potential of connection signal CNCT has been lowered and hence that connector 310 and inlet 270 have been connected. In response, CPU 508 activates control signal S1 to turn on switch SW1. Accordingly, the potential of pilot signal CPLT is lowered to V2 (e.g., 9 V) by pull down resistor R1 of resistor circuit 502.

At time t12, CCID control unit 610 detects that the potential of pilot signal CPLT has been lowered to V2. In response, CCID control unit 610 oscillates pilot signal CPLT in accordance with an oscillation period Tchr (=1/Fchr). Note that Fchr represents oscillatory frequency.

When CPU 508 detects that pilot signal CPLT is oscillated, CPU 508 detects a rated current of charging cable 300 by a duty of pilot signal CPLT, as described above.

Then, CPU 508 activates control signal S2 to turn on switch SW2 to start a charging operation. In response, the potential of pilot signal CPLT is lowered to V3 (e.g., 6 V) by pull down resistor R2 (as indicated in FIG. 3 at time t13).

When CCID control unit 610 detects that the potential of pilot signal CPLT has been lowered to V3, the contact of CCID relay 332 is closed at time t14 to transmit electric power from external power supply 402 to vehicle 10 via charging cable 300.

Thereafter when AC voltage VAC is detected in vehicle 10, the contact of relay 155 (see FIG. 1) is closed by CPU 508 and power conversion device 160 (see FIG. 1) is also controlled to start charging power storage device 150 (see FIG. 1) (as indicated in FIG. 3 at time t15).

Charging power storage device 150 proceeds and when it is determined that power storage device 150 has been fully charged, CPU 508 ends the charging process (as indicated in FIG. 3 at time t16). Then, CPU 508 deactivates control signal S2 to set switch SW2 to a non conducting state (as indicated in FIG. 3 at time t17). Thus pilot signal CPLT attains potential V2, and in response the charging process is stopped and CCID relay 332 is also set to the non-conducting state (at time t18) and the charging operation ends. Thereafter, CPU 508 deactivates control signal S1 to set switch SW1 to the non-conducting state to disconnect the system.

First Embodiment

An externally chargeable vehicle as described above can store to a power storage device thereof electric power received from a commercial power supply or a similar power supply external thereto.

On the other hand, it has been discussed to consider a vehicle as a power supply source to supply electric power that is stored in the vehicle to electrical equipment external to the vehicle, such as seen in a so-called smart grid. Furthermore, the vehicle may be used as a power supply when electrical equipment is used in camping, outdoor and other activities.

Figure 4:
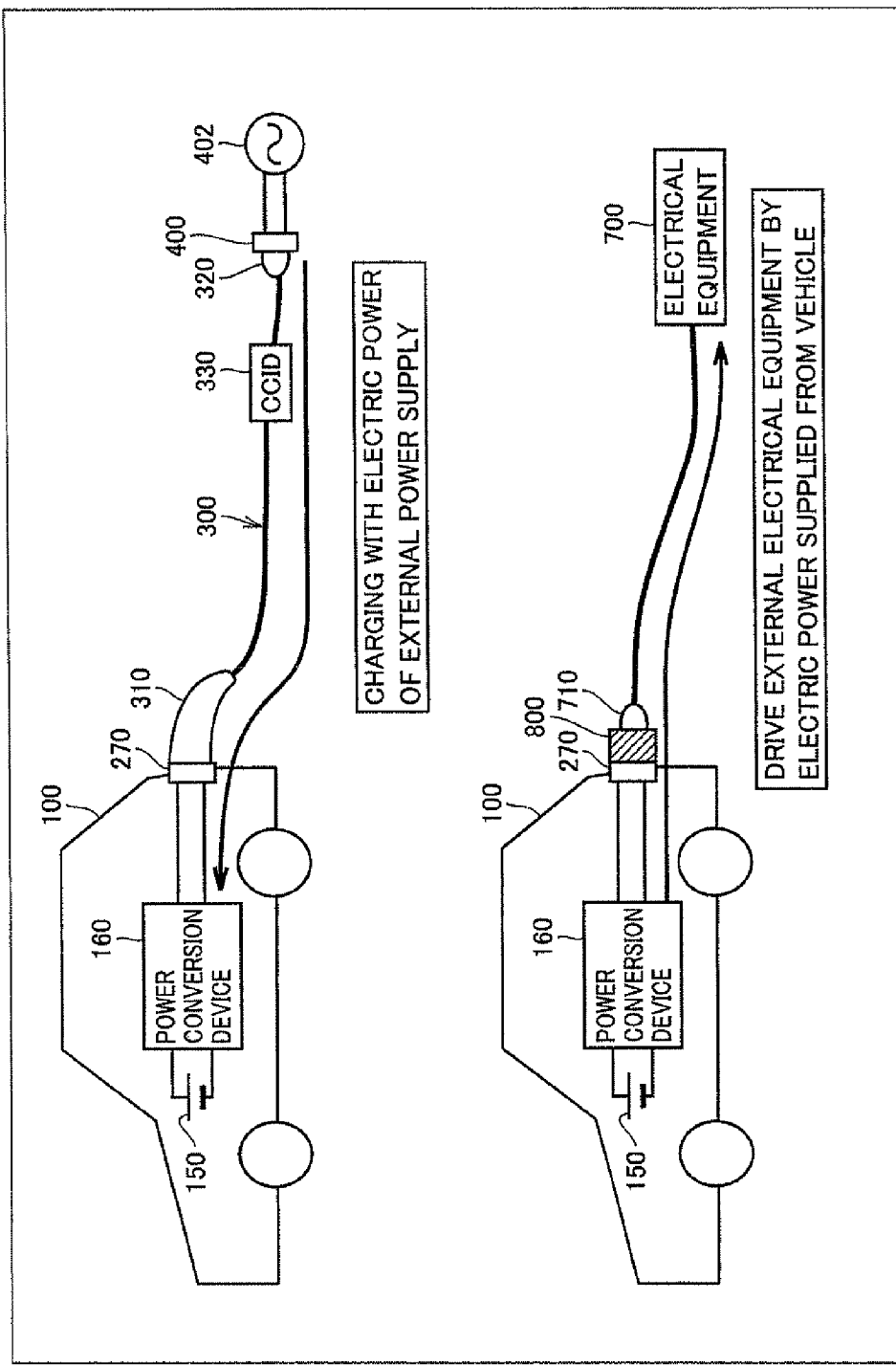
FIG. 4 is a schematic diagram for outlining the present embodiment.

In that case, it would be suitable if the electric power for the vehicle can be supplied via inlet 270 that allows charging cable 300 to be connected thereto in the external charging, as shown in FIG. 4, as this can eliminate the necessity of separately providing an outlet for connecting electrical equipment, and can eliminate or reduce the necessity of modifying the vehicle.

Accordingly in the present embodiment, as shown in FIG. 4 at the lower portion, there is provided an adapter 800 for conversion that, by connecting it to inlet 270 that allows charging cable 300 to be connected thereto in the external charging, allows power supply plug 710 of electrical equipment 700 external to the vehicle to be connected directly to vehicle 10 and also allows vehicle 10 to supply electric power to electrical equipment 700 external to the vehicle via inlet 270 (hereinafter also referred to as an "external power supply operation").

By connecting adapter 800, power conversion device 160 of vehicle 10 converts DC power stored in power storage device 150 serving as a power generation device into AC power (e.g., AC 100 V, 200 V, or the like) that electrical equipment 700 can use, and supplies the electric power to electrical equipment 700, as will be described hereinafter.

Note that the power generation device of vehicle 10 includes power storage device 150, and in addition thereto engine 140 and motor generator 120 for a hybrid vehicle having engine 140 as shown in FIG. 1. In that case, electric power generated in motor generator 120 driven by engine 140 (AC power) is converted via motor drive unit 180 and power conversion device 160 into AC power that electrical equipment 700 can use, and supplied to electrical equipment 700. Furthermore, although not shown to FIG. 1, it is also possible to use electric power received from an auxiliary battery for supplying power supply voltage to an auxiliary device included in vehicle 10. Alternatively, if vehicle 10 is a fuel-cell vehicle, it is also possible to supply electric power generated by a fuel cell.

Accordingly in the present embodiment, power conversion device 160 is required to have a function to convert electric power received from external power supply 402 into electric power to charge power storage device 150, as described above, and in addition, a function to convert electric power stored in vehicle 10 and/or electric power generated in vehicle 10 into electric power to drive external electrical equipment 700. Note that power conversion device 160 may be a single power conversion device capable of a bidirectional power conversion operation of the external charging and the external power supply operation, or may be discrete power conversion devices dedicated to the external charging and the external power supply operation, respectively.

Figure 5:
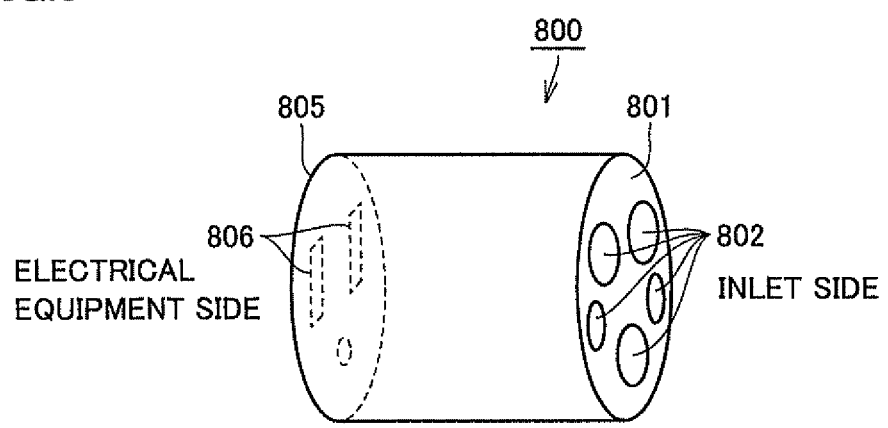
FIG. 5 is a schematic diagram of an adapter according to the present embodiment.

FIG. 5 is a schematic diagram showing an example of adapter 800 used in the external power supply operation, as has been described with reference to FIG. 4.

With reference to FIG. 4 and FIG. 5, adapter 800 has a connection portion 801 for connection to inlet 270 and a connection portion 805 for connecting power supply plug 710 of external electrical equipment 700.

Connection portion 801 associated with inlet 270 is provided with a terminal portion 802 connectable to a terminal of inlet 270. The shape and terminal arrangement of connection portion 801 correspond to inlet 270.

Furthermore, connection portion 805 associated with electrical equipment 700 is provided with a terminal portion 806 corresponding to a terminal of power supply plug 710 of electrical equipment 700 in geometry. Terminal portion 806 is adapted in geometry to the voltage used (100 V, 200 V, or the like), a specification of the country in which it is used, and the like.

Figure 6:
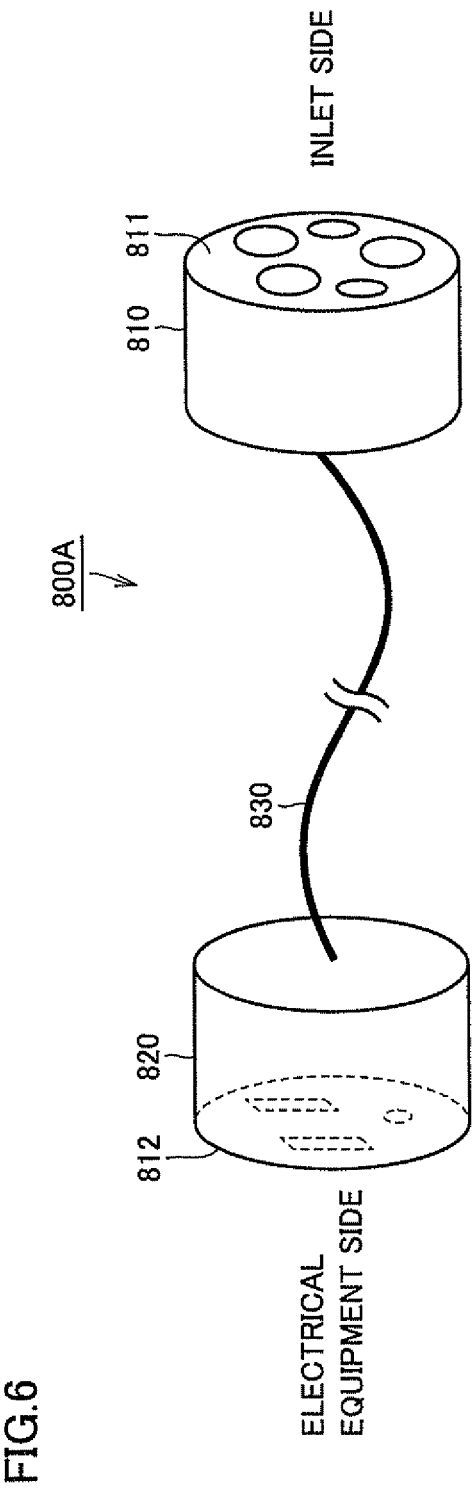
FIG. 6 is a schematic diagram of another example of the adapter according to the present embodiment.

Note that while FIG. 5 shows an example with connection portions 801, 805 accommodated in a single casing to provide an integral structure, they may alternatively be configured for example as shown in FIG. 6, which shows an adapter 800A having a connector 810 that is associated with inlet 270 and a connector 820 that is associated with electrical equipment 700 separated from each other and coupled by a cable 830 that is a power transmission medium. This example also provides a connection portion 811 that is associated with inlet 270 and a connection portion 812 that is associated with electrical equipment 700 to geometrically correspond to inlet 270 and power supply plug 710, respectively, and have terminal arrangement corresponding to inlet 270 and power supply plug 710, respectively.

Figure 7:
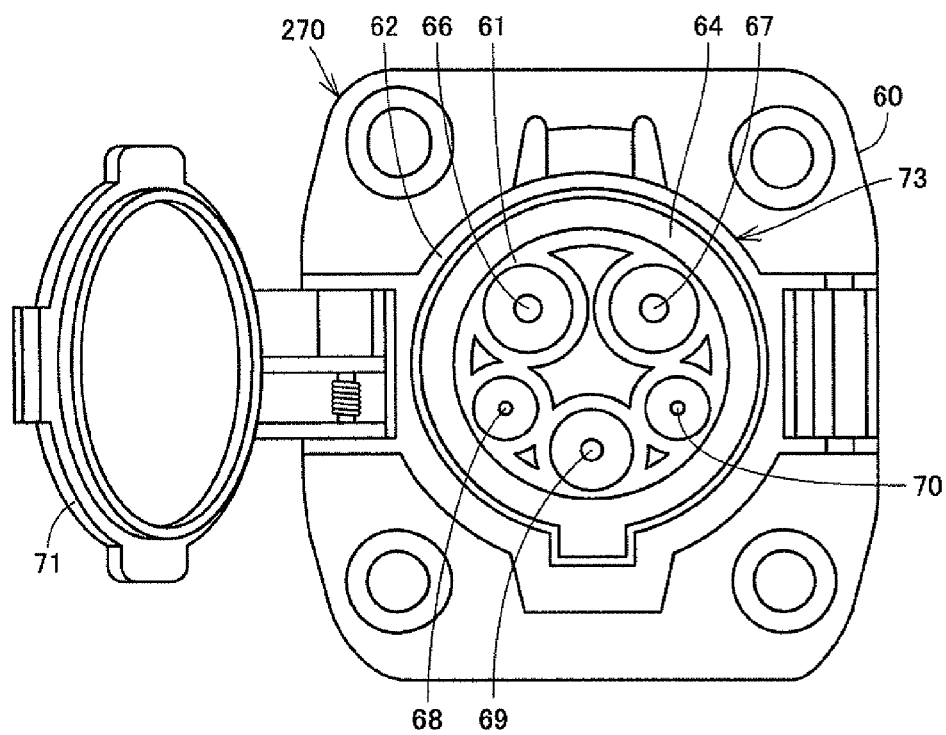
FIG. 7 is a schematic diagram of an inlet of a vehicle.

FIG. 7 is a front view of an example of inlet 270 allowing the FIG. 5 adapter 800 to be connected thereto. With reference to FIG. 7, inlet 270 is configured including a body 60 and connection terminals 66, 67, 68, 69 and 70.

Body 60 is attached to the body of vehicle 10. Body 60 has as its constituents a terminal surrounding portion 61 and a peripheral portion 62 formed integrally. Connection terminals 66, 67, 68, 69 and 70, terminal surrounding portion 61, and peripheral portion 62 form a fitting portion 73.

Terminal surrounding portion 61 surrounds each of connection terminals 66-70. Terminal surrounding portion 61 extends in the form of a column in a direction in which connection terminals 66-70 extend. Peripheral portion 62 is provided radially outer than terminal surrounding portion 61. An annularly extending gap 64 is provided between terminal surrounding portion 61 and peripheral portion 62.

Body 60 is attached such that connection terminals 66-70 extend toward a position at which an operator stands when charging, i.e., toward a lateral side of the vehicle. Body 60 is further provided with a lid 71. Lid 71 is provided to be opened and closed as desired in front of terminal surrounding portion 61 facing connection terminals 66-70 and peripheral portion 62.

Connection terminals 66-70 are configured including two terminals for a power cable passing a current to charge or supply electric power, one terminal for earthing, and two terminals for a signal line. Connection terminals 66-70 are disposed to together radially surround a center axis of terminal surrounding portion 61 that extends in the form of a column, and mutually spaced. Connection terminals 66-70 are each disposed in a columnar space surrounded by terminal surrounding portion 61.

Then will be described a circuit configuration with adapter 800 used to supply electric power from vehicle 10 to electrical equipment 700 through inlet 270.

Figure 8:
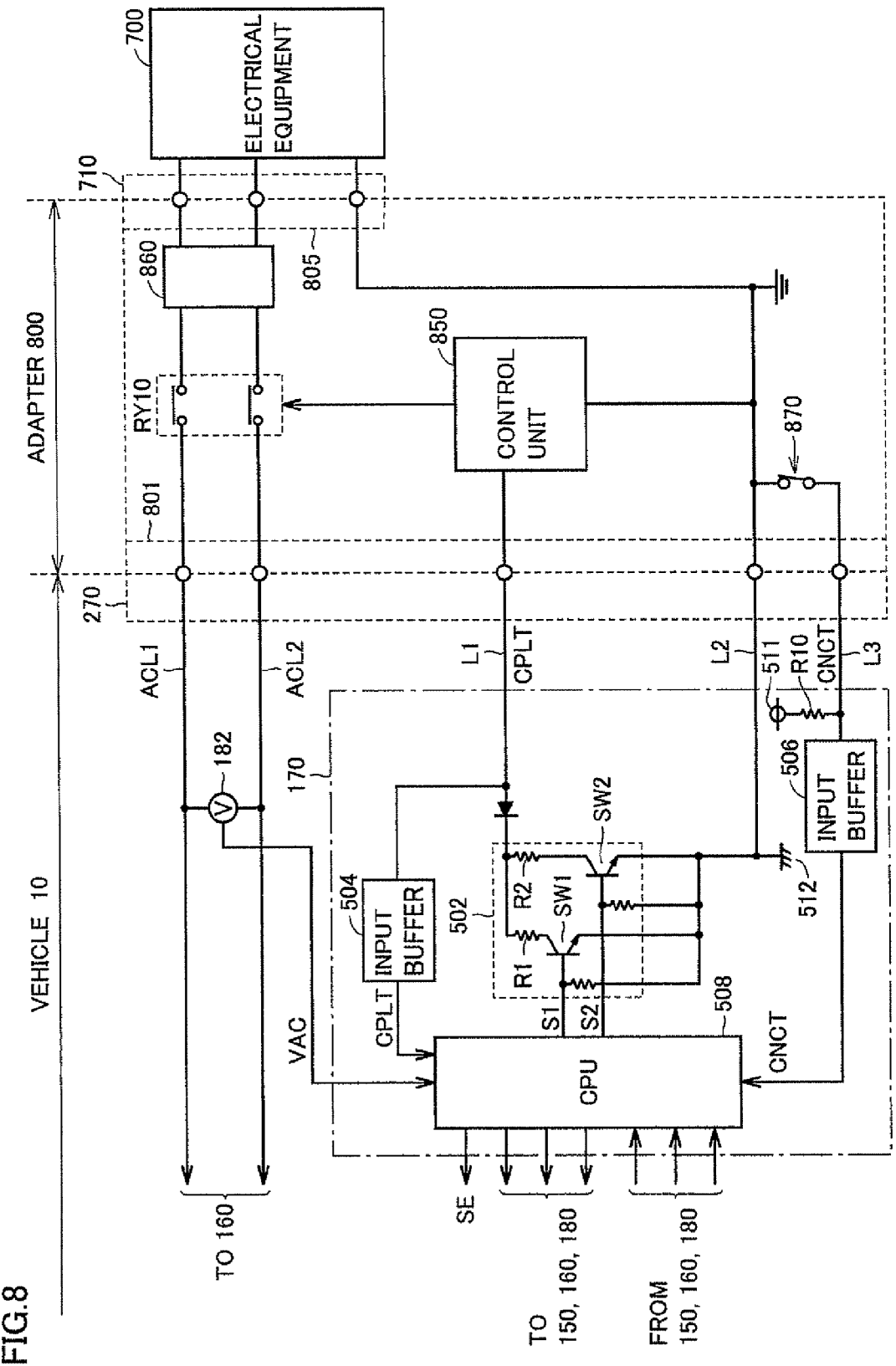
FIG. 8 specifically shows a circuit used to supply electric power via an adapter according to a first embodiment.

FIG. 8 specifically shows a circuit used to supply electric power via adapter 800 according to the first embodiment. FIG. 8 shows vehicle 10 similar in configuration to FIG. 2, and those components also shown in FIG. 2 will not be described repeatedly.

With reference to FIG. 8, adapter 800 includes a control unit 850, a leakage detector 860, a connection sensing circuit 870, and a relay RY10.

Relay RY10 is inserted in a path electrically connecting terminal portion 802 and terminal portion 806 shown in FIG. 5. Relay RY10 is controlled by control unit 850 to switch between supplying and interrupting electric power from vehicle 10 to electrical equipment 700.

Leakage detector 860 is inserted in a path electrically connecting terminal portion 802 and terminal portion 806. Leakage detector 860 is similar in function to leakage detector 608 provided in CCID 330 of charging cable 300 shown in FIG. 2, and when leakage detector 860 detects that leakage has occurred, leakage detector 860 interrupts electric power supplied from vehicle 10 to electrical equipment 700.

When adapter 800 is connected to inlet 270, control unit 850 is connected to control pilot line L1 and ground line L2 of vehicle 10. As well as control pilot circuit 334 in charging cable 300, control unit 850 can output pilot signal CPLT to vehicular ECU 170 via control pilot line L1. Note that, as will be described later, pilot signal CPLT output by control unit 850 can adopt a frequency and/or a potential different than that output by control pilot circuit 334 in charging cable 300. Then, control unit 850 can thereby cause vehicular ECU 170 to recognize that the equipment that is connected to inlet 270 is not charging cable 300 but adapter 800. In other words, in the first embodiment, pilot signal CPLT is used as a signal indicative of an instruction to supply electric power.

Note that control unit 850 may be a control device having a CPU or may be a control circuit exhibiting a desired function. Furthermore, when control unit 850 requires power supply voltage for driving, the power supply voltage may be supplied from a battery (not shown) incorporated in adapter 800 or may be supplied from vehicle 10 via a power supply line (not shown).

When adapter 800 is connected to inlet 270, connection sensing circuit 870 is connected to connection signal line L3 and ground line L2 of vehicle 10. When adapter 800 is connected to inlet 270, connection sensing circuit 870, as well as connection sensing circuit 312 of charging cable 300, short-circuits connection signal line L3 and ground line L2 to lower a potential of connection signal line L3 to a ground potential.

Thus, adapter 800 utilizes pilot signal CPLT and connection signal CNCT that are used in the external charging to cause vehicular ECU 170 to recognize that adapter 800 is connected to inlet 270 and to perform a power supply operation to external electrical equipment 700.

Figure 9:
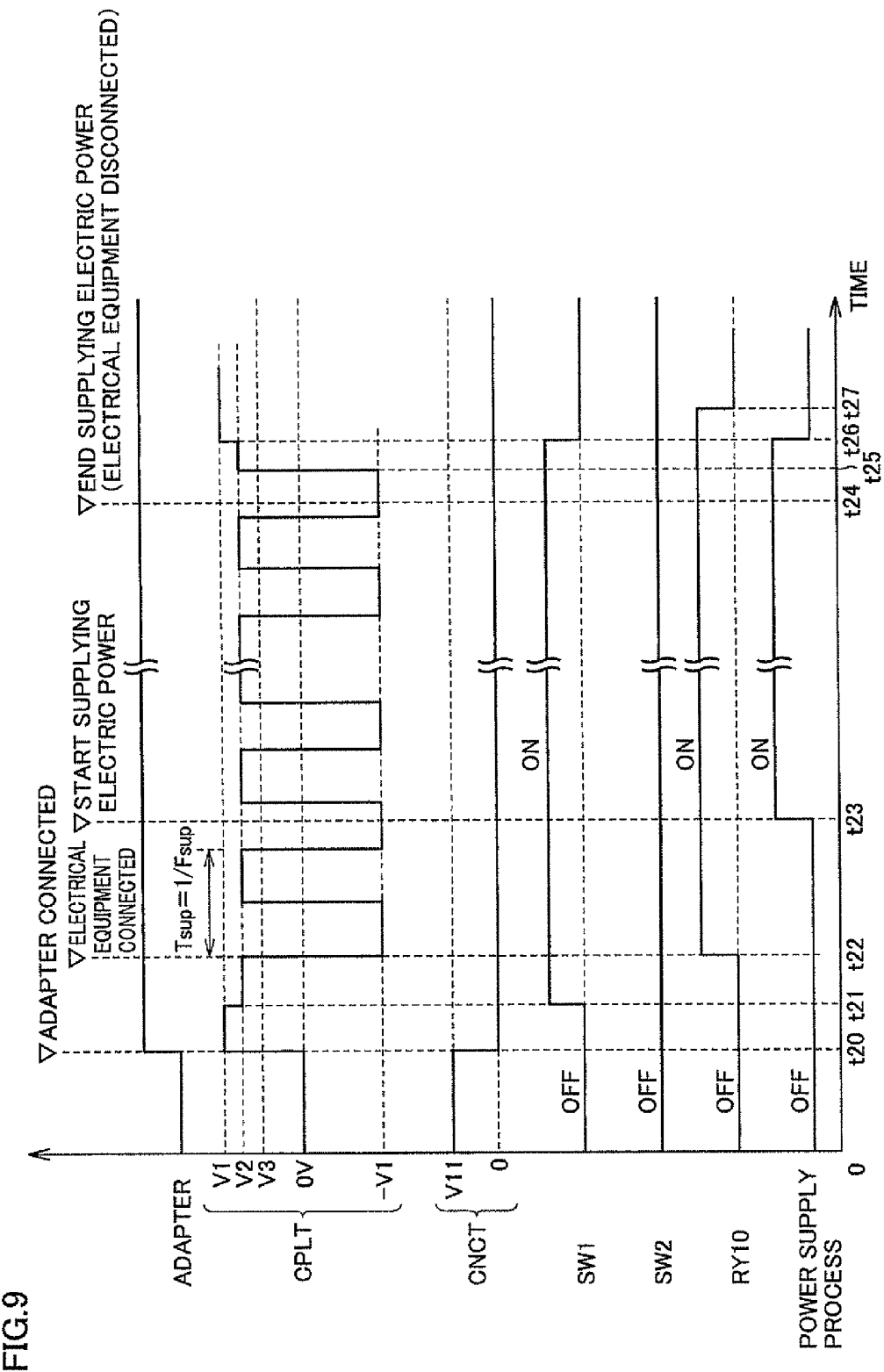
FIG. 9 is a timing chart for illustrating power supply control in the first embodiment.

FIG. 9 is a timing chart for illustrating power supply control in the first embodiment. In FIG. 9, an axis of abscissa represents time and an axis of ordinate represents a connection status of adapter 800, a potential of pilot signal CPLT, a potential of connection signal CNCT, statuses of switches SW1 and SW2, a status of relay RY10, and a status of a power supply process.

With reference to FIG. 8 and FIG. 9, before time t20 arrives, adapter 800 is not connected to inlet 270. In this state, switches SW1 and SW2 and relay RY10 are turned off and pilot signal CPLT has a potential of 0 V. Furthermore, connection signal CNCT has potential V11 (>0 V).

At time t20, adapter 800 is connected to inlet 270, and the adapter 800 control unit 850 generates pilot signal CPLT. Note that at time t20, pilot signal CPLT has potential V1 (e.g., 12 V), and pilot signal CPLT is not oscillating.

Furthermore, when adapter 800 is connected, the potential of connection signal CNCT is lowered by connection sensing circuit 870. CPU 508 detects that the potential of connection signal CNCT has been lowered, and hence CPU 508 detects connection to inlet 270. In this state, however, it cannot be determined whether connector 310 of charging cable 300 or adapter 800 is connected. Accordingly, in response, CPU 508 activates control signal S1 to turn on switch SW1 (at time t21). Accordingly, as has been described with reference to FIG. 3, the potential of pilot signal CPLT is lowered to V2 (e.g., 9 V) by pull down resistor R1 of resistor circuit 502.

At time t22, power supply plug 710 of electrical equipment 700 is connected to adapter 800, and, in response, control unit 850 oscillates pilot signal CPLT in accordance with an oscillation period Tsup (=1/Fsup) longer than oscillation period Tchr applied in the external charging of FIG. 3. In other words, Tchr<Tsup (Fchr>Fsup). Note that the fact that power supply plug 710 has been connected to adapter 800 is recognized for example by detecting that electrical equipment 700 varies in impedance. Furthermore, at time t22, control unit 850 closes relay RY10.

While CPU 508 detects that pilot signal CPLT has been oscillated, oscillatory frequency Fsup of pilot signal CPLT output from control unit 850 in the power supply operation is lower than oscillatory frequency Fchr applied in the charging operation, as has been set forth above, and from this difference between the oscillatory frequencies, CPU 508 recognizes that adapter 800, rather than connector 310, is connected.

Then, CPU 508 closes the contact of relay 155 and also controls power conversion device 160 (see FIG. 1) to start supplying electric power from power storage device 150 (see FIG. 1) to electrical equipment 700 (at time t23).

Thereafter, at time t24, power supply plug 710 of electrical equipment 700 is detached from adapter 800, and control unit 850 stops pilot signal CPLT from oscillating (at time t25). In response, CPU 508 stops the power supply process and also turns off switch SW1 (at time t26). Thereafter at time t27 control unit 850 disconnects relay RY10.

Figure 10:
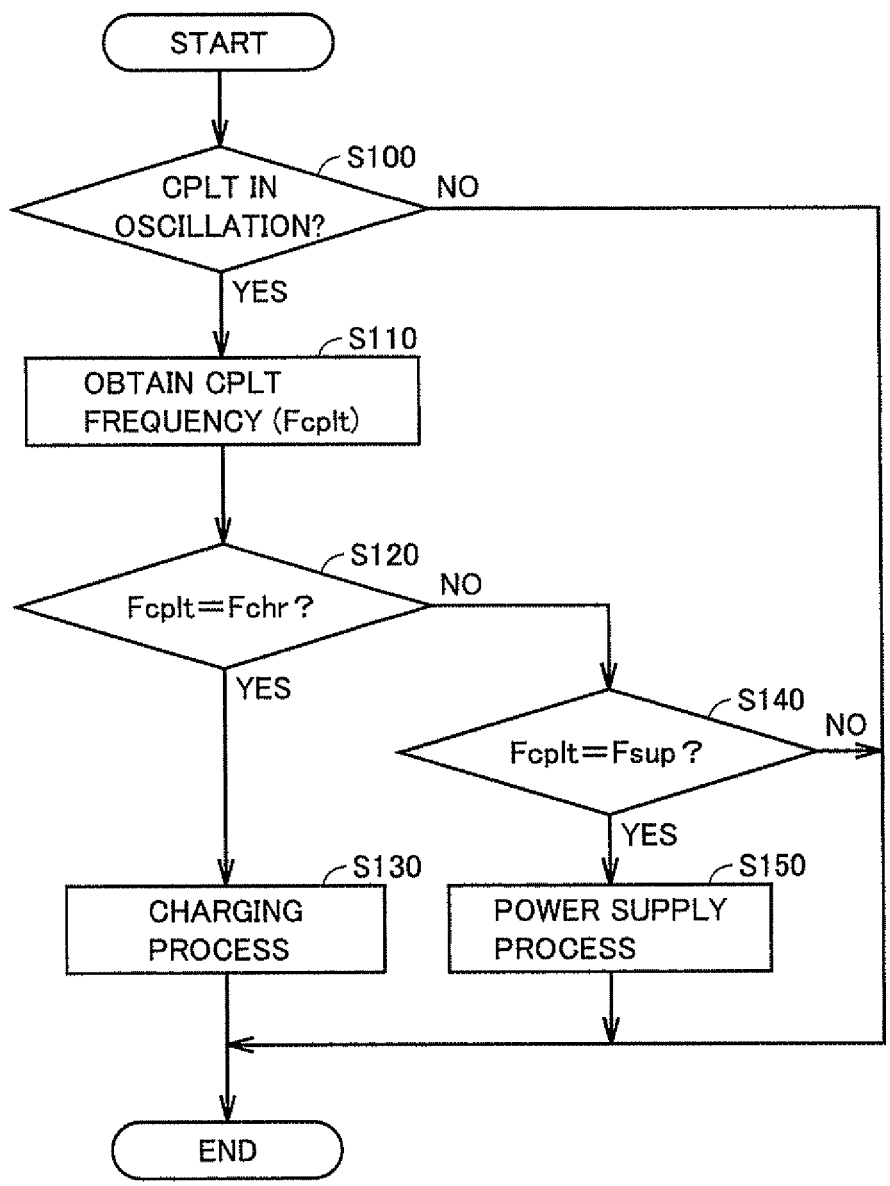
FIG. 10 is a flowchart for illustrating a power supply control process in the first embodiment.

FIG. 10 is a flowchart for illustrating a power supply control process performed by CPU 508 in the first embodiment. The flowchart of FIG. 10 and that of FIG. 12 described later represent processes implemented by executing periodically as predetermined a program previously stored in CPU 508. Alternatively, the processes may have some step(s) processed by exclusively configured, dedicated hardware (or electronic circuitry).

With reference to FIG. 8 and FIG. 10, CPU 508 determines in Step (hereinafter indicated as "S") 100 whether pilot signal CPLT is oscillating.

If pilot signal CPLT is not oscillating (NO in S100), neither charging cable 300 nor adapter 800 is connected to inlet 270, and accordingly, CPU 508 ends the process.

If pilot signal CPLT is oscillating (YES in S100), the process proceeds to S110 and CPU 508 obtains oscillatory frequency Fcplt of pilot signal CPLT.

Then, CPU 508 determines in S120 whether oscillatory frequency Fcplt obtained is oscillatory frequency Fchr applied in the charging operation. Note that in the determination in S120 it is not a requirement that oscillatory frequency Fcplt obtained completely matches oscillatory frequency Fchr applied in the charging operation; rather, the determination only requires whether oscillatory frequency Fcplt and oscillatory frequency Fchr have a difference falling within a prescribed range ($|Fcplt-Fchr|<\alpha 1$).

If oscillatory frequency Fcplt is oscillatory frequency Fchr (YES in S120), CPU 508 recognizes that charging cable 300 is connected to inlet 270. Then, the process proceeds to S130 and CPU 508 cooperates with CCID 330 of charging cable 300 to perform the charging process, as has been described with reference to FIG. 3.

In contrast, if oscillatory frequency Fcplt is not oscillatory frequency Fchr (NO in S120), the process proceeds to S140 and CPU 508 determines whether oscillatory frequency Fcplt obtained is oscillatory frequency Fsup applied in the power supply operation. Note that this determination, as well as the S120 determination, also does not require whether oscillatory frequency Fcplt obtained completely matches oscillatory frequency Fsup applied in the power supply operation; rather, the determination only requires whether oscillatory frequency Fcplt and oscillatory frequency Fsup have a difference falling within a prescribed range ($|Fcplt-Fsup|<\alpha 2$).

If oscillatory frequency Fcplt is oscillatory frequency Fsup (YES in S140), CPU 508 recognizes that adapter 800 is connected to inlet 270. Then, the process proceeds to S150 and, as has been described with reference to FIG. 9, the control cooperates with control unit 850 of adapter 800 to perform the power supply process.

In contrast, if oscillatory frequency Fcplt is not oscillatory frequency Fsup (NO in S140), CPU 508 cannot determine whether the charging operation or the power supply operation should be performed, and accordingly, CPU 508 ends the process.

Performing such a process for control allows a conversion adapter for an inlet to be used for an externally chargeable vehicle to connect a power supply plug of electrical equipment external to the vehicle directly to the vehicle and also supply electric power from the vehicle to the electrical equipment.

Note that while the above example indicates a case in which oscillatory frequency Fsup of pilot signal CPLT applied when adapter 800 is connected to inlet 270 is smaller than oscillatory frequency Fchr applied when charging cable 300 is connected to inlet 270 (in other words, a case with a long oscillation period), on the contrary, oscillatory frequency Fsup may be set to be larger than oscillatory frequency Fchr.

Exemplary Variation of First Embodiment

In the first embodiment, when the charging cable is connected to the inlet pilot signal CPLT has an oscillatory frequency, whereas when the adapter is connected to the inlet pilot signal CPLT has a different oscillatory frequency, and therefrom the vehicular CPU recognizes whether the charging cable or the adapter is connected to the inlet.

A variation of the first embodiment will be described for a configuration in which pilot signal CPLT has a potential different from that used in the charging operation to cause the control to recognize whether the charging cable or the adapter is connected to the inlet.

Figure 11:
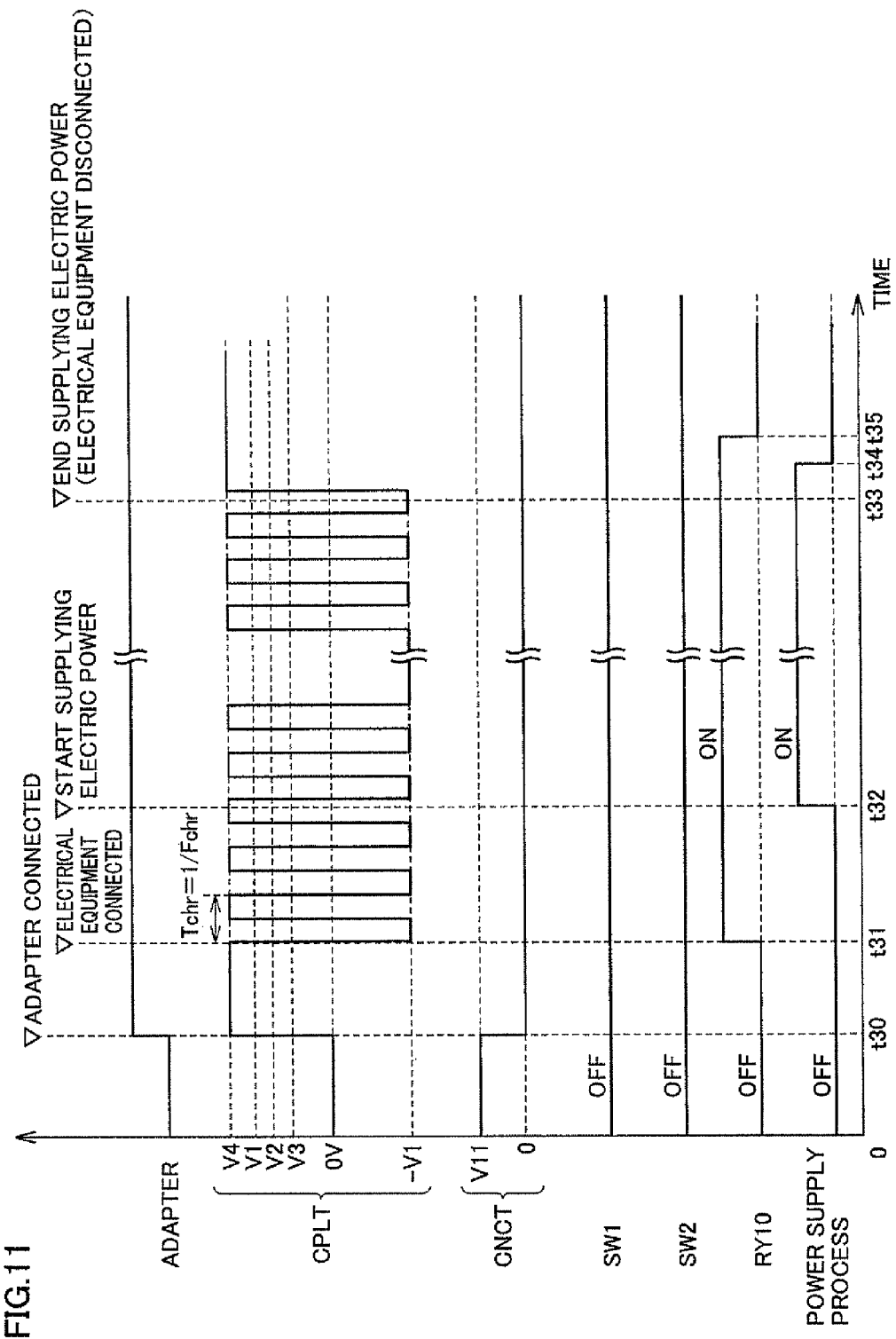
FIG. 11 is a timing chart for illustrating power supply control in a variation of the first embodiment.

FIG. 11 is a timing chart for illustrating power supply control in the variation of the first embodiment. In FIG. 11, as well as FIG. 9 referred to in the first embodiment, an axis of abscissa represents time and an axis of ordinate represents a connection status of adapter 800, a potential of pilot signal CPLT, a potential of connection signal CNCT, statuses of switches SW1 and SW2, a status of relay RY10, and a status of a power supply process.

With reference to FIGS. 8 and 11, at time t30, adapter 800 is connected to inlet 270, and the potential of connection signal CNCT is lowered by connection sensing circuit 870. CPU 508 detects that the potential of connection signal CNCT has been lowered, and hence CPU 508 detects connection to inlet 270.

On the other hand, when adapter 800 is connected to inlet 270, the adapter 800 control unit 850 generates pilot signal CPLT. Note that, in the variation of the first embodiment, control unit 850 outputs pilot signal CPLT at a potential V4 (for example of 15 V) higher than potential V1 applied when charging cable 300 is connected. CPU 508 in vehicle 10 detects that pilot signal CPLT has potential V4 and CPU 508 thus recognizes that adapter 800 has been connected to inlet 270. Accordingly, switch SW1 is not rendered conducting in the variation of the first embodiment.

At time t31, power supply plug 710 of electrical equipment 700 is connected to adapter 800, and, in response, control unit 850 oscillates pilot signal CPLT. The signal may or may not have an oscillatory frequency equal to that similar to that applied in the external charging, or oscillation period Tchr, since the fact that adapter 800 has been connected is recognized from the potential of pilot signal CPLT.

Furthermore, control unit 850 closes relay RY10 in response to electrical equipment 700 having power supply plug 710 connected to adapter 800.

At time t32, CPU 508 recognizes that power supply plug 710 of electrical equipment 700 has been connected to adapter 800 as pilot signal CPLT oscillates. Then, CPU 508 controls relay 155 and power conversion device 160 to perform an operation to supply electric power to electrical equipment 700.

Thereafter, at time t33, the user detaches power supply plug 710 of electrical equipment 700 from adapter 800, and control unit 850 stops pilot signal CPLT from oscillating. In response, CPU 508 ends the power supply process (as indicated in FIG. 11 at time t34) and control unit 850 opens relay RY10 (as indicated in FIG. 11 at time t35).

Figure 12:
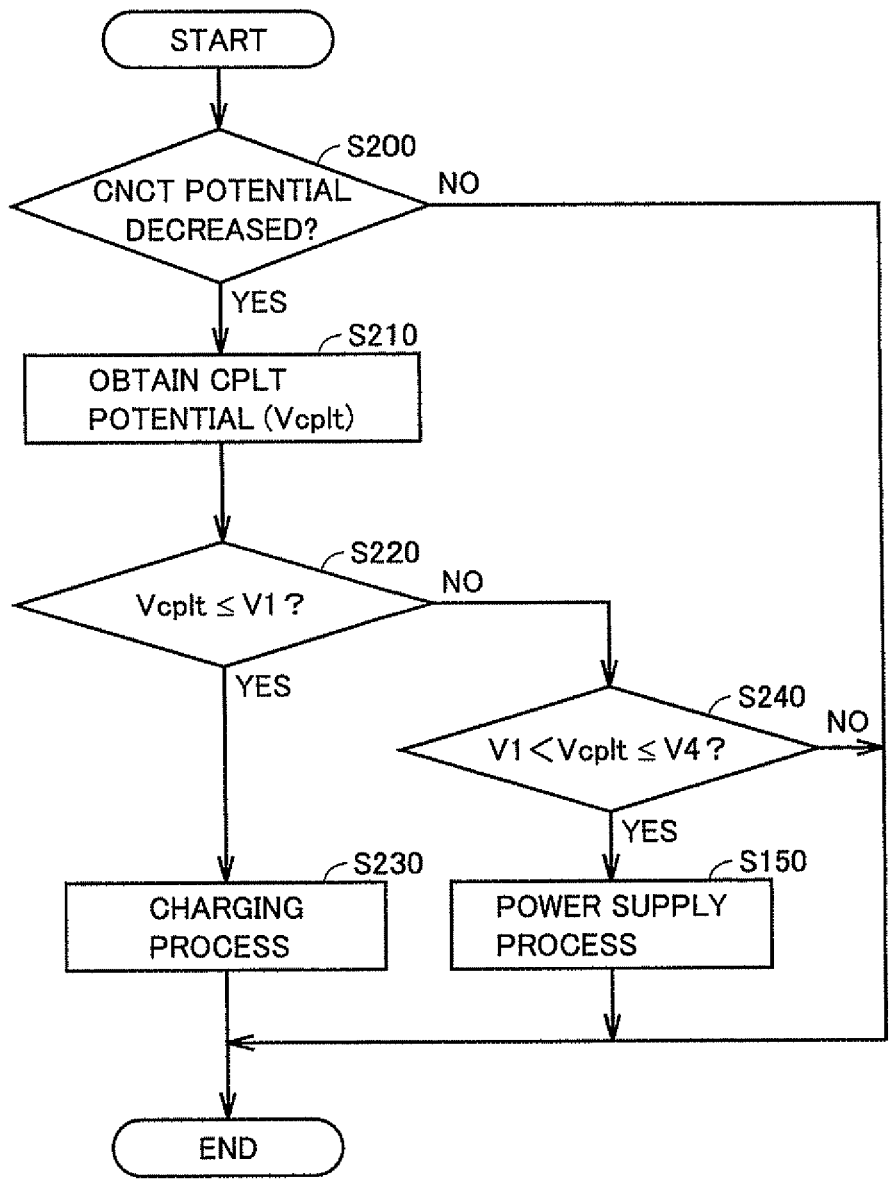
FIG. 12 is a flowchart for illustrating a power supply control process in the variation of the first embodiment.

FIG. 12 is a flowchart for illustrating a power supply control process in the variation of the first embodiment.

With reference to FIG. 8 and FIG. 12, CPU 508 determines in S200 whether connection signal CNCT is lowered.

If connection signal CNCT is not lowered (NO in S200), neither charging cable 300 nor adapter 800 is connected to inlet 270, and accordingly, CPU 508 ends the process.

If connection signal CNCT is lowered (YES in S200), the process proceeds to S210 and CPU 508 obtains potential Vcplt of pilot signal CPLT.

Then, CPU 508 determines in S220 whether potential Vcplt obtained is equal to or smaller than potential V1 applied in the charging operation (Vcplt≤V1).

If potential Vcplt is equal to or smaller than V1 (YES in S220), CPU 508 recognizes that charging cable 300 is connected to inlet 270. Then, the process proceeds to S230 and CPU 508 cooperates with CCID 330 of charging cable 300 to perform the charging process, as has been described with reference to FIG. 3.

In contrast, if potential Vcplt is larger than V1 (NO in S220), the process proceeds to S240 and CPU 508 determines whether potential Vcplt obtained is larger than V1 and equal to or smaller than V4 (V1<Vcplt≤V4).

If potential Vcplt is larger than V1 and equal to or smaller than V4 (YES in S240) CPU 508 recognizes that adapter 800 is connected to inlet 270. Then, the process proceeds to S250 and, as has been described with reference to FIG. 11, the control cooperates with control unit 850 of adapter 800 to perform the power supply process.

In contrast, if potential Vcplt is larger than V4 (NO in S240), CPU 508 ends the process.

Performing such a process for control allows a conversion adapter for an inlet to be used for an externally chargeable vehicle to connect a power supply plug of electrical equipment external to the vehicle directly to the vehicle to supply electric power from the vehicle to the electrical equipment.

Second Embodiment

The first embodiment has been described for a configuration utilizing pilot signal CPLT to cause the vehicular ECU to recognize that the adapter is connected to the inlet.

A second embodiment will be described for a configuration having an inlet and a communication method in conformity with the SAE standard to cause the vehicular ECU to recognize that the adapter is connected to the inlet, with connection signal CNCT used as a power supply instruction signal.

Figure 13:
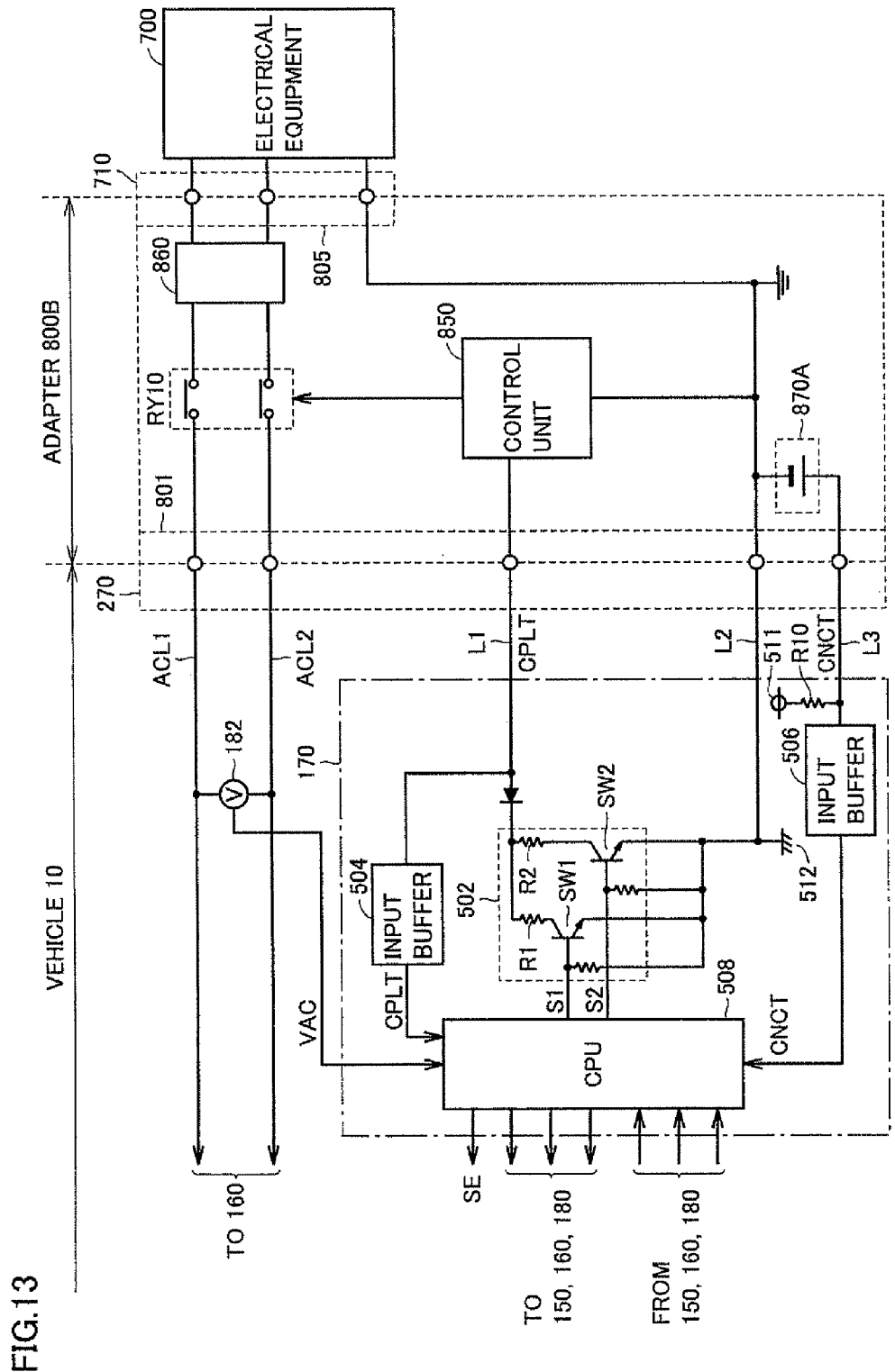
FIG. 13 specifically shows a circuit used to supply electric power via an adapter according to a second embodiment.

FIG. 13 specifically shows a circuit with an adapter 800B according to the second embodiment used to supply electric power. Adapter 800B in FIG. 13 corresponds to adapter 800 in FIG. 8 of the first embodiment with connection sensing circuit 870 replaced with a connection sensing circuit 870A. Those components in FIG. 13 which are also shown in FIGS. 2 and 8 will not be described repeatedly.

With reference to FIG. 13, connection sensing circuit 870 illustrated in FIG. 8 is such that when adapter 800 is connected to inlet 270, connection sensing circuit 870 short-circuits connection signal line L3 to ground line L2 to set connection signal CNCT to a ground potential or lowers connection signal CNCT to a prescribed potential by a specific resistor.

The second embodiment provides adapter 800B including connection sensing circuit 870A including a voltage source that can for example pull up the potential of connection signal CNCT to a level higher than potential V11 of power supply node 511.

CPU 508 can thus detect that the potential of connection signal CNCT is higher than potential V11 to recognize that adapter 800B has been connected to inlet 270. Thereafter, CPU 508 performs the power supply process to supply electric power from vehicle 10 via inlet 270 to electrical equipment 700.

Furthermore, it is not a requirement that the potential of connection signal CNCT is larger than potential V11, and connection sensing circuit 870A may be a resistor that has a particular resistance value as long as it can generate a potential different than when the charging cable is connected.

Furthermore, in place of or in addition to varying the potential of connection signal CNCT, as described above, connection signal CNCT may be oscillated in the form of a pulse to allow the vehicular ECU to recognize that adapter 800B is connected to inlet 270.

Third Embodiment

The first and second embodiments have been described for a configuration with an inlet and an adapter in conformity with the SAE standard. However, an externally chargeable vehicle does not necessarily have an inlet in conformity with the SAE standard. In other words, pilot signal CPLT and connection signal CNCT might not be used.

Accordingly in a third embodiment will be described a configuration that does not utilize pilot signal CPLT and connection signal CNCT in causing the vehicular ECU to recognize that the adapter is connected to the inlet to supply electric power via the inlet to external electrical equipment.

Figure 14:
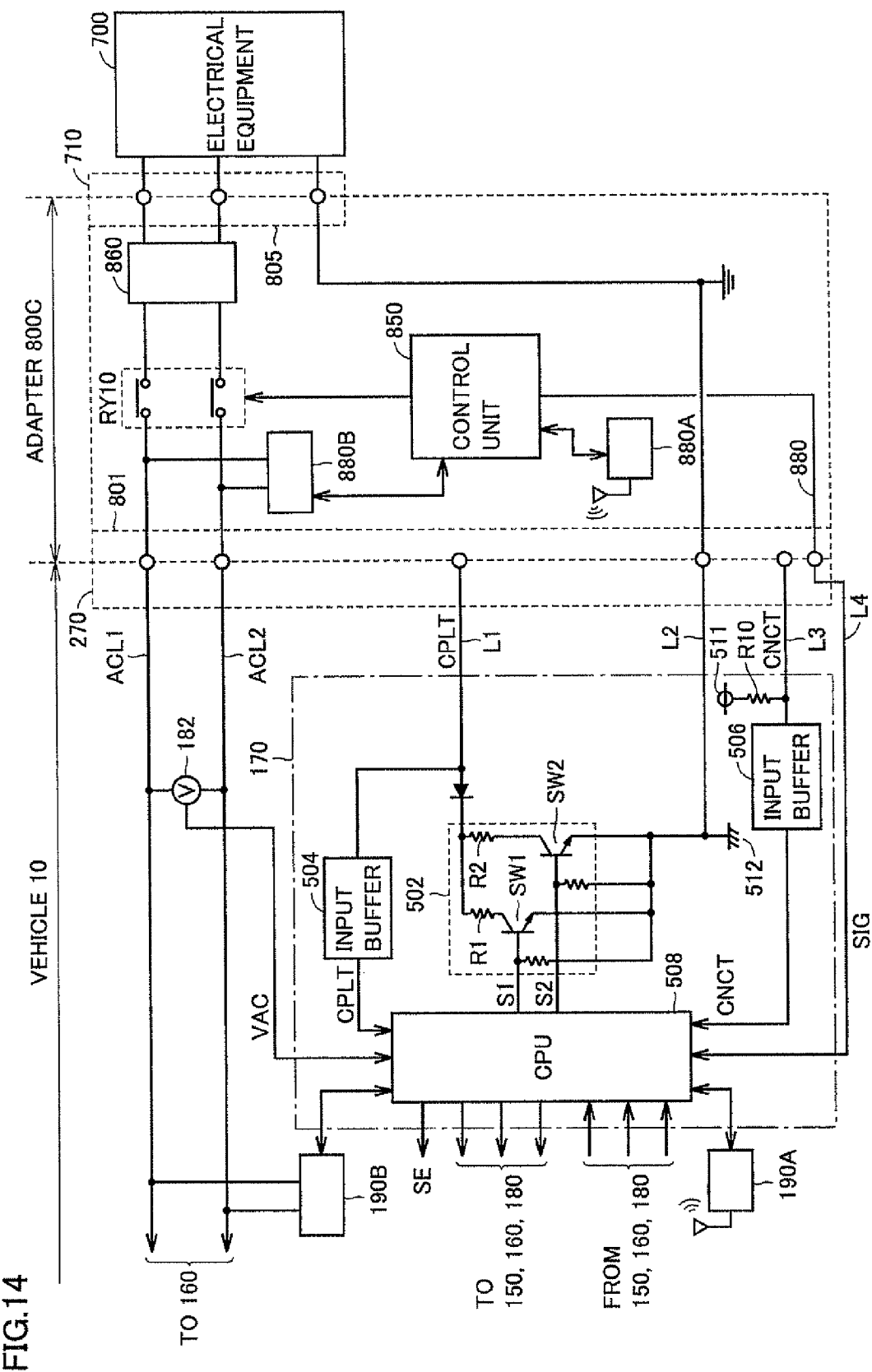
FIG. 14 specifically shows a circuit used to supply electric power via an adapter according to a third embodiment.

FIG. 14 specifically shows a circuit used to supply electric power via an adapter 800C according to the third embodiment. While in FIG. 14 some communication means will be described between control unit 850 of adapter 800C and CPU 508 of vehicle 10, it is not necessary to include all these communication means, and at least one of these communication means may be included. Those components in FIG. 14 which are also shown in FIGS. 2, 8 and 13 will not be described repeatedly.

With reference to FIG. 14, adapter 800C further includes a communication line 880 and communication units 880A and 880B as a means of communication with CPU 508.

Communication line 880 is connected to a communication line L4 of vehicle 10 via inlet 270. Communication line L4 is connected to CPU 508 and communicates with control unit 850 by wire. This allows CPU 508 to receive a signal SIG indicating that adapter 800C has been connected to inlet 270 to allow CPU 508 to recognize a connection status of adapter 800C.

Such a communication means via a dedicated communication line is advantageously, relatively easily adoptable when inlet 270 has another available terminal.

Communication unit 880A is a wireless communication device for example employing infrared wave, electric wave, microwave, or the like. Communication unit 880A can communicate wirelessly with a communication unit 190A that is a wireless communication device provided to vehicle 10 correspondingly. Communication unit 190A receives a signal transmitted from control unit 850 via communication unit 880A and transmits the received signal to CPU 508. CPU 508 can thus recognize that adapter 800C has been connected to inlet 270.

The communication means by the wireless communication device is effective when inlet 270 does not have an available terminal or vehicle 10 has an equivalent of communication unit 190A already mounted therein for another application or the like.

Communication unit 880B is a power communication module for performing power line communication (PLC) using a power line. Communication unit 880B receives a signal from control unit 850 and sends it on a power line to transmit it to vehicle 10.

Vehicle 10 receives a signal that is sent out from adapter 800C by communication unit 190B that is a power communication module coupled with power lines ACL1 and ACL2. Communication unit 190B transmits the received signal to CPU 508.

Thus pilot signal CPLT and connection signal CNCT can be dispensed with and another communication means can instead be used to cause the vehicular ECU to recognize the adapter's connection status to supply electric power from the vehicle to electrical equipment external to the vehicle.

Note that "vehicular ECU 170" and "control unit 850" in the present embodiments are an example of a "first control device" and a "second control device" in the present invention, respectively.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST

10: vehicle; 20: drive unit; 60: body; 61: terminal surrounding portion; 62: peripheral portion; 64: gap; 66, 67, 68, 69, 70: connection terminal; 71: lid; 73: fitting portion; 120: motor generator; 130: driving wheel; 140: engine; 145: power split device; 150: power storage device; 155, 332, RY10: relay; 160: power conversion device; 170: vehicular ECU; 180: motor drive unit; 182, 604, 650: voltage sensor; 190A, 190B, 880A, 880B: communication unit; 270: inlet; 300: charging cable; 310, 810, 820: connector; 312, 870, 870A: connection sensing circuit; 320: plug; 330: CCID; 334: control pilot circuit; 340, 340A, 340B: electric line portion; 341: power line; 400: power outlet; 402: external power supply; 502 resistor circuit; 504, 506: input buffer; 511: power supply node; 512: vehicular ground; 602: oscillation device; 606: electromagnetic coil; 608, 860: leakage detector; 610: CCID control unit; 660: current sensor; 700: electrical equipment; 710: power supply plug; 800, 800A-800C: adapter; 801, 805, 811, 812: connection portion; 802, 806: terminal portion; 830: cable; 850: control unit; 880, L4: communication line; ACL1, ACL2: power line; L1: control pilot line; L2: ground line; L3: connection signal line; R1, R2, R10, R20: resistor; SW1, SW2; switch.

The invention claimed is:

1. An adapter connected to a vehicle capable of external charging to charge a power storage device mounted therein with electric power supplied from an external power supply via a charging cable, the adapter being used to receive electric power from a power generation device mounted in the vehicle and supply the received electric power to electrical equipment external to the vehicle, the adapter comprising:
    a first connection portion that corresponds in geometry to an inlet allowing the charging cable to be connected thereto and is connectable to the inlet;
    a second connection portion that is electrically connected to the first connection portion, and also corresponds in geometry to a power supply plug of the electrical equipment and allows the power supply plug to be connected thereto; and
    a connection sensing circuit that provides a connection signal, which in the external charging is transmitted on a path to indicate that the charging cable has a connector connected to the inlet, on the path when the first connection portion is connected to the inlet,
    the connection sensing circuit setting the connection signal to a potential to cause the vehicle to recognize that the adapter has been connected, the potential being different from that applied when the connector of the charging cable is connected to the inlet.

2. An adapter connected to a vehicle capable of external charging to charge a power storage device mounted therein with electric power supplied from an external power supply via a charging cable the adapter being used to receive electric power from a power generation device mounted in the vehicle and supply the received electric power to electrical equipment external to the vehicle, the adapter comprising:
    a first connection portion that corresponds in geometry to an inlet allowing the charging cable to be connected thereto and is connectable to the inlet; and
    a second connection portion that is electrically connected to the first connection portion, and also corresponds in geometry to a power supply plug of the electrical equipment and allows the power supply plug to be connected thereto, the adapter transmitting a power supply instruction signal, which is indicative of an instruction to supply electric power to the electrical equipment, to the vehicle by utilizing a path that transmits a connection signal indicating that a connector of the charging cable is connected to the inlet.

3. The adapter according to claim 2, wherein the power supply instruction signal is set to a potential of the connection signal different from a potential used in the external charging.

4. The adapter according to claim 3, further comprising a connection sensing circuit that provides the power supply instruction signal on the path that transmits the connection signal when the first connection portion is connected to the inlet, wherein the connection sensing circuit sets the power supply instruction signal to a potential of the connection signal different from the potential used in the external charging.

5. The adapter according to claim 1, wherein the connection sensing circuit is a resistor.

6. The adapter according to claim 1, wherein the connection sensing circuit includes a voltage source.

7. The adapter according to claim 2, wherein the vehicle includes a power conversion device for converting electric power received from the power generation device, and supplying the converted electric power to the inlet, and a first control device for controlling the power conversion device, the adapter further comprising a second control device configured to be capable of outputting a signal to the first control device, wherein the second control device, with the first connection portion connected to the inlet, outputs the power supply instruction signal to the first control device to cause the first control device to control the power conversion device to supply electric power from the power generation device to the electrical equipment.

8. The adapter according to claim 2, wherein:

the vehicle includes a power conversion device for converting electric power received from the power generation device, and supplying the converted electric power to the inlet, and a control device for controlling the power conversion device; and the control device controls the power conversion device in response to the power supply instruction signal to supply electric power from the power generation device to the electrical equipment.

9. A vehicle allowing a power storage device mounted therein to be charged with electric power supplied from an external power supply via a charging cable, the vehicle allowing an adapter to be connected thereto to supply electric power to external electrical equipment, the vehicle comprising:

a power generation device;
an inlet for connecting a connector of the charging cable in external charging; and
a control device, the adapter including
a first connection portion connectable to the inlet,
a second connection portion allowing a power supply plug of the electrical equipment to be connected thereto, and
a connection sensing circuit that provides a connection signal, which in the external charging is transmitted on a path to indicate that the charging cable has the connector connected to the inlet, on the path when the first connection portion is connected to the inlet, the connection sensing circuit setting the connection signal to a potential that is different from that applied when the connector of the charging cable is connected to the inlet, the control device determining according to the potential of the connection signal whether the adapter has been connected to the inlet, and if the adapter has been connected to the inlet, then the control device allowing electric power to be supplied from the power generation device to the inlet.

10. The vehicle according to claim 9, further comprising a power conversion device for converting electric power received from the power generation device, and supplying the converted electric power to the inlet.

11. A vehicle allowing a power storage device mounted therein to be charged with electric power supplied from an external power supply via a charging cable, the vehicle allowing an adapter to be connected thereto to supply electric power to external electrical equipment, the vehicle comprising:

a power generation device;
an inlet for connecting a connector of the charging cable in external charging; and
a control device, the adapter including
a first connection portion connectable to the inlet, and
a second connection portion allowing a power supply plug of the electrical equipment to be connected thereto, the control device being operative in response to a power supply instruction signal, which is indicative of an instruction to supply electric power to the electrical equipment, transmitted from the adapter through a path, which transmits a connection signal indicating that the charging cable has the connector connected to the inlet, to supply electric power from the power generation device to the inlet.

12. The vehicle according to claim 11, further comprising a power conversion device for converting electric power received from the power generation device, and supplying the converted electric power to the inlet.

13. A method of supplying electrical equipment external to a vehicle via an adapter with electric power received from a power generation device mounted in the vehicle, the vehicle being capable of external charging to charge a power storage device mounted therein with electric power supplied from an external power supply via a charging cable, the vehicle including an inlet for connecting the charging cable in the external charging, the adapter including a first connection portion that corresponds in geometry to the inlet and is connectable to the inlet, a second connection portion allowing a power supply plug of the electrical equipment to be connected thereto, and a connection sensing circuit that provides a connection signal, which in the external charging is transmitted on a path to indicate that the charging cable has a connector connected to the inlet, on the path when the first connection portion is connected to the inlet, the method comprising the steps of:

connecting the first connection portion to the inlet;
connecting the power supply plug to the second connection portion;
when the first connection portion is connected to the inlet, controlling the connection sensing circuit to set the connection signal to a potential that is different from that applied when the connector of the charging cable is connected to the inlet;
determining according to the potential of the connection signal whether the adapter has been connected to the inlet; and if the adapter has been connected to the inlet, supplying electric power from the power generation device to the inlet.

14. The method according to claim 13, wherein the vehicle further includes a power conversion device for converting electric power received from the power generation device, and supplying the converted electric power to the inlet.

15. A method of supplying electrical equipment external to a vehicle via an adapter with electric power received from a power generation device mounted in the vehicle, the vehicle being capable of external charging to charge a power storage device mounted therein with electric power supplied from an external power supply via a charging cable, the vehicle including an inlet for connecting the charging cable in the external charging, the adapter including a first connection portion that corresponds in geometry to the inlet and is connectable to the inlet, and a second connection portion that is electrically connected to the first connection portion and also allows a power supply plug of the electrical equipment to be connected thereto, the method comprising the steps of:

connecting the first connection portion to the inlet;
connecting the power supply plug to the second connection portion;
when the first connection portion is connected to the inlet, receiving a power supply instruction signal output from the adapter and indicative of an instruction to supply electric power to the electrical equipment; and
supplying electric power from the power generation device to the inlet in response to the power supply instruction signal indicative of the instruction to supply electric power to the electrical equipment.

16. The method according to claim 15, wherein the vehicle further includes a power conversion device for converting electric power received from the power generation device, and supplying the converted electric power to the inlet.

* * * * *